(12) United States Patent
Kakehi et al.

(10) Patent No.: US 7,812,503 B2
(45) Date of Patent: Oct. 12, 2010

(54) PIEZOELECTRIC ACTUATOR DRIVE DEVICE

(75) Inventors: Tatsuya Kakehi, Anjo (JP); Noboru Nagase, Anjo (JP)

(73) Assignee: Denso Corporation, Kariya (JP)

( * ) Notice: Subject to any disclaimer, the term of this patent is extended or adjusted under 35 U.S.C. 154(b) by 211 days.

(21) Appl. No.: 12/194,159

(22) Filed: Aug. 19, 2008

(65) Prior Publication Data
US 2009/0051247 A1 Feb. 26, 2009

(30) Foreign Application Priority Data
Aug. 22, 2007 (JP) ............... 2007-216155

(51) Int. Cl.
*H01L 41/08* (2006.01)
(52) U.S. Cl. ............... 310/317; 310/316.03
(58) Field of Classification Search ............ 310/316.03
See application file for complete search history.

(56) References Cited

U.S. PATENT DOCUMENTS

| 5,208,505 | A  | * | 5/1993  | Mitsuyasu ............... 310/317 |
| 6,384,512 | B1 |   | 5/2002  | Maeda |
| 6,407,593 | B1 |   | 6/2002  | Kawamoto et al. |
| 6,441,535 | B2 | * | 8/2002  | Freudenberg et al. .. 310/316.03 |
| 6,563,252 | B2 | * | 5/2003  | Schrod ............... 310/316.03 |
| 6,661,285 | B1 | * | 12/2003 | Pompei et al. ............. 330/251 |
| 7,455,051 | B2 | * | 11/2008 | Gotzenberger ............. 123/478 |
| 2003/0205949 | A1 | * | 11/2003 | Rueger et al. .......... 310/316.03 |
| 2007/0296307 | A1 | * | 12/2007 | Fukagawa et al. ...... 310/316.03 |

FOREIGN PATENT DOCUMENTS

| JP | 4-285479    | 10/1992 |
| JP | 2001-15332  | 1/2001  |
| JP | 2002-136156 | 5/2002  |
| JP | 2002-203988 | 7/2002  |
| JP | 2003-148221 | 5/2003  |
| JP | 2003-319667 | 11/2003 |
| JP | 2004-248457 | 9/2004  |
| JP | 2004-320869 | 11/2004 |
| JP | 2005-16431  | 1/2005  |
| JP | 2007-113547 | 5/2007  |

OTHER PUBLICATIONS

Japanese Office Action dated Aug. 18, 2009, issued in corresponding Japanese Application No. 2007-216155, with English Translation.

* cited by examiner

*Primary Examiner*—Mark Budd
(74) *Attorney, Agent, or Firm*—Nixon & Vanderhye PC

(57) ABSTRACT

A fuel injection control apparatus drives piezoelectric actuators for opening and closing injectors of respective cylinders based on energy stored in a capacitor of a DC/DC converter. A current detecting resistor for controlling a boost switch to charge the capacitor is disposed at a position at which current flowing through the capacitor is not detected. Further, current detecting resistors for controlling the piezoelectric actuators are disposed at positions at which charging current from a diode to the capacitor is not detected. Thus, the charging of the capacitor can be performed even during the control for charging/discharging the piezoelectric actuator.

14 Claims, 12 Drawing Sheets

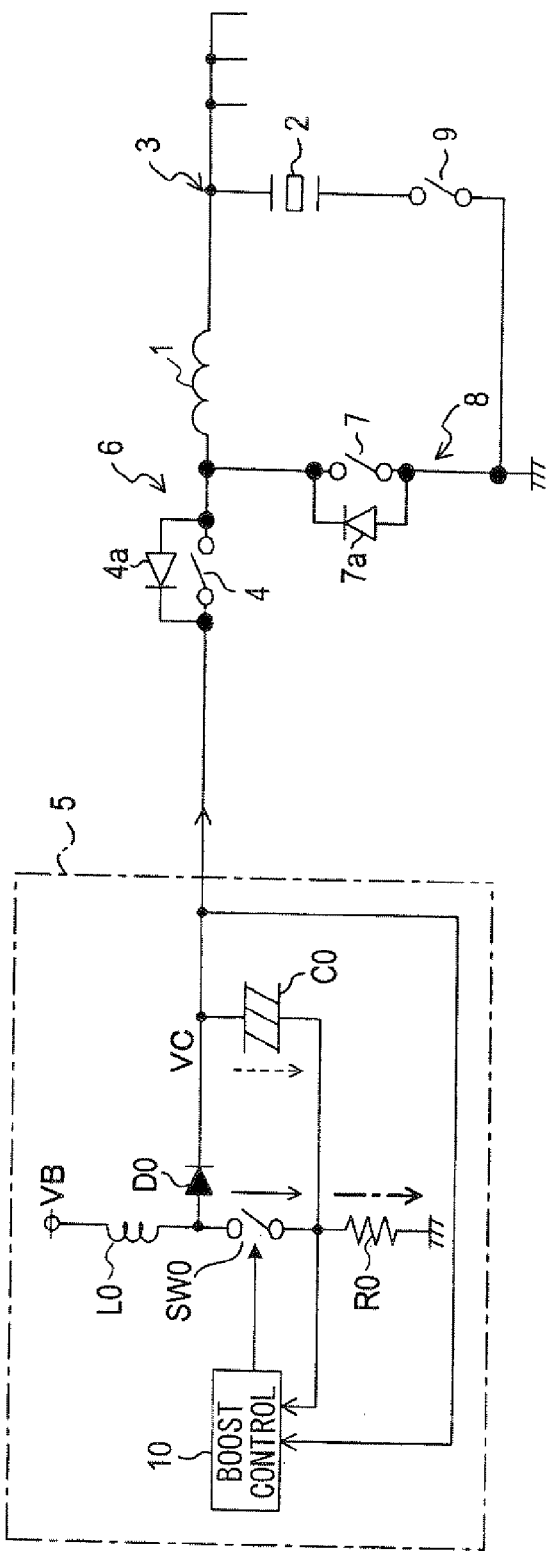
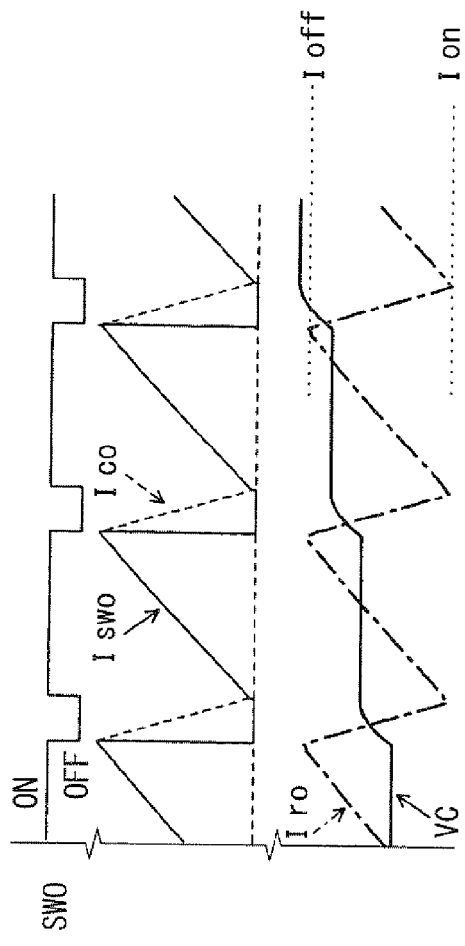
FIG. 13A PRIOR ART
FIG. 13B PRIOR ART

PIEZOELECTRIC ACTUATOR DRIVE DEVICE

CROSS REFERENCE TO RELATED APPLICATION

This application is based on and incorporates herein by reference Japanese Patent Application No. 2007-216155 filed on Aug. 22, 2007.

FIELD OF THE INVENTION

The present invention relates to a device for driving a piezoelectric actuator and more particularly to a piezoelectric actuator drive device which is applied to a fuel injection control apparatus for an engine.

BACKGROUND OF THE INVENTION

In a piezoelectric actuator, a stack of piezoelectric plates is expanded or contracted by electric charging/discharging, thereby to rectilinearly move a piston or the like. A piezoelectric injector for fuel injection is opened and closed by such expansion and contraction of the stack of piezoelectric plates.

In addition, a fuel injection control apparatus (JP 2002-136156A), which controls the fuel injection into an internal combustion engine by driving the piezoelectric injector, includes a DC/DC converter of the boost type. In this converter, a voltage higher than a battery voltage is generated as a power source voltage across a capacitor, so that the piezoelectric actuator within the piezoelectric injector is charged by electric energy stored in the capacitor.

Here, an example of the fuel injection control apparatus of this type is shown in FIG. 13A.

First, a DC/DC converter 5 includes a boosting coil L0 which is fed with a battery voltage VB at one end thereof, a boost switch SW0 which is connected in series on the path between the other end of the boosting coil L0 and a ground potential (=0 V) being a reference potential, a reverse-flow preventing diode D0 whose anode is connected to the current path between the other end of the boosting coil L0 and the boost switch SW0, a capacitor C0 which is connected in series on the path between the cathode of the reverse-flow preventing diode D0 and the ground potential, and a boost controller 10 which controls the boost switch SW0.

In addition, the terminal of the boost switch SW0 opposite to the side of the boosting coil L0 and the terminal of the capacitor C0 opposite to the side of the diode D0 are connected to the ground potential through a resistor R0, which is for current detection. A switching element such as a MOSFET or a bipolar transistor is employed as the boost switch SW0.

In such a DC/DC converter 5 (U.S. Pat. No. 6,407,593, JP 2001-15332A), as shown in FIG. 13B, when the boost switch SW0 is turned on, a current Iro flows through the boosting coil L0 via the boost switch SW0 and the resistor R0. In addition, when the boost switch SW0 changes from ON to OFF, the capacitor C0 is charged through the reverse-flow preventing diode D0 by a counter-electromotive force induced in the boosting coil L0 (a high voltage which is several times to ten odd times as large as the battery voltage VB). Therefore, each time the ON/OFF operation of the boost switch SW0 is repeated, the capacitor C0 is charged, and the voltage VC of the capacitor C0 (capacitor voltage VC) is raised more.

Here, a boost SW current Iswo indicated by a solid line at the second stage of FIG. 13B is a current which flows through the boosting coil L0 and the boost switch SW0, and a capacitor current Ico indicated by a broken line is a charging current which flows from the charging coil L0 to the capacitor C0 through the reverse-flow preventing diode D0. In addition, both the boost SW current and the capacitor current become a current which flows through the resistor R0, as indicated by a dot-and-dash line at the third stage of FIG. 13B. Besides, discharging from the capacitor C0 onto the side of the boost switch SW0 is prevented by the reverse-flow preventing diode D0.

In the DC/DC converter 5, therefore, when the boost controller 10 starts boost switching control for turning on and off the boost switch SW0, this boost switch SW0 is first turned on.

In addition, as shown in FIG. 13B, when the boost controller 10 holds the boost switch SW0 in the ON state thereof it detects the current Iswo flowing through the boost switch SW0 (the boost SW current), on the basis of a voltage generated across the resistor R0. Besides, when the boost controller 10 determines that the current has increased to a preset OFF changeover threshold value Iofff, it changes the boost switch SW0 from ON to OFF. Further, when the boost controller 10 holds the boost switch SW0 in the OFF state thereof, it detects the charging current flowing from the reverse-flow preventing diode D0 to the capacitor C0 (the capacitor current), on the basis of a voltage generated across the resistor R0. In addition, when the boost controller 10 determines that the charging current has decreased to a preset ON changeover threshold value Ion (in this example, substantially 0 A), it changes the boost switch SW0 from OFF to ON.

Due to the repetition of such operations, the boost switch SW0 is repeatedly turned on and off, and the capacitor C0 is charged stepwise. In addition, the boost controller 10 monitors the capacitor voltage VC. When the capacitor voltage VC has reached a target value (a target charged voltage), the boost controller 10 stops the boost switching control and holds the boost switch SW0 in the OFF state thereof.

Further, as shown in FIG. 13A, the fuel injection control apparatus includes a charging/discharging coil 1 which is connected in series with a piezoelectric actuator 2, a charging path 6 which serves to feed a supply voltage from the positive terminal of the capacitor C0 (that is, the terminal of the capacitor C0 opposite to the ground potential side thereof) through a charging switch 4 to a series circuit 3 of the charging/discharging coil 1 and the piezoelectric actuator 2, and a discharging path 8 which is connected in parallel with the series circuit 3 and which serves to discharge the stored charges of the piezoelectric actuator 2 through a discharging switch 7.

The piezoelectric actuator 2 of this example is included in an injector which injects fuel into any one of the plurality of cylinders of the internal combustion engine, and it opens the injector by being expanded. This piezoelectric actuator 2 is one of a plurality of piezoelectric actuators which are connected in series with the charging/discharging coil 1 and in parallel with one another. Therefore, the terminal of the piezoelectric actuator 2 opposite to the side of the charging/discharging coil 1 (the terminal of the piezoelectric actuator 2 on the negative side thereof) is connected to the ground potential through a selection switch (cylinder selection switch) 9 which is a switching element for selecting this piezoelectric actuator 2 as an element to-be-driven. In addition, the selection switch 9 is turned on during a period for which the fuel injection into the cylinder corresponding to the piezoelectric actuator 2 is executed.

Still further, in this example, the charging switch 4 and the discharging switch 7 are MOSFETs, and diodes 4a and 7a in FIG. 13A are the parasitic diodes of the MOSFETs forming the switches 4 and 7, respectively.

In the fuel injection control apparatus, as shown in FIG. 14A, when a drive signal Sd for commanding the drive of the piezoelectric actuator 2 becomes an active level (in this example, "high"), a charging switching control in which the ON/OFF of the charging switch 4 is repeated is performed in the ON state of the selection switch 9 and the OFF state of the discharging switch 7, whereby the piezoelectric actuator 2 is charged and expanded to consequently open the injector.

That is, in the charging switching control mode (a charging period), the charging switch 4 is turned on in the OFF state of the discharging switch 7, whereby a charging current Ic is caused to flow from the positive terminal of the capacitor C0 to the piezoelectric actuator 2 as indicated by an arrow of solid line in FIG. 14A. Thereafter, the charging switch 4 is turned off, whereby a charging current (namely, a flywheel current) which flows due to energy stored in the charging/discharging coil 1 is caused to flow from the negative side to the positive side of the piezoelectric actuator 2 through the parasitic diode 7a of the discharging switch 7 as indicated by an arrow of broken line in FIG. 14A. The piezoelectric actuator 2 is charged stepwise by repeating such a procedure.

In FIG. 14C, a piezoelectric current Ip signifies the current which flows through the piezoelectric actuator 2, and a piezoelectric voltage Vp signifies the terminal voltage or positive side voltage of the piezoelectric actuator 2. Besides, in the waveform of the piezoelectric current in FIG. 14A, each of parts indicated by solid lines represents the charging current of the piezoelectric actuator 2 in the ON period of the charging switch 4, and each of parts indicated by broken lines represents the charging current of the piezoelectric actuator 2 in the OFF period of the charging switch 4.

In the fuel injection control apparatus, as shown in FIG. 14B, when the drive signal thereafter becomes an inactive level (in this example, "low"), a discharging switching control in which the ON/OFF of the discharging switch 7 is repeated in the OFF state of the charging switch 4 is performed, whereby the piezoelectric actuator 2 is discharged and contracted to consequently close the injector.

That is, in the discharging switching control mode (a discharging period), the discharging switch 7 is turned on in the OFF state of the charging switch 4, whereby a discharging current Id is caused to flow from the positive side of the piezoelectric actuator 2 through the charging/discharging coil 1 and the discharging switch 7 as indicated by an arrow of broken line in FIG. 14B. Thereafter, the discharging switch 7 is turned off, whereby a discharging current is caused to flow from the positive side of the piezoelectric actuator 2 to the positive terminal of the capacitor C0 through the charging/discharging coil 1 and the parasitic diode 4a of the charging switch 4 as indicated by an arrow of solid line in FIG. 14B, and the charges of the piezoelectric actuator 2 are recovered into the capacitor C0 by the discharging current. The piezoelectric actuator 2 is discharged stepwise by repeating such a procedure.

In the waveform of the piezoelectric current Ip in FIG. 14D, a negative direction corresponds to a discharging direction. Besides, in the waveform of the piezoelectric current Ip, each of parts indicated by broken lines represents the discharging current of the piezoelectric actuator 2 in the ON period of the discharging switch 7, and each of parts indicated by solid lines represents the discharging current of the piezoelectric actuator 2 in the OFF period of the discharging switch 7.

Meanwhile, in the fuel injection control apparatus of this type, when the charging switch 4 has been turned on in the charging switching control, the current (the current in a discharging direction) flows through the capacitor C0, as indicated by the arrow of the solid line in FIG. 14A, and also when the discharging switch 7 has been turned off in the discharging switching control, the current (the current in a charging direction) flows through the capacitor C0, as indicated by the arrow of the solid line in FIG. 14B.

In the DC/DC converter 5 disposed in the prior art fuel injection control apparatus, the charging current which flows from the reverse-flow preventing diode D0 to the capacitor C0 is detected by the resistor R0, and the boost switch SW0 is controlled using the detection value.

In consequence, while the charging switching control and the discharging switching control for driving the piezoelectric actuator 2 are being executed, the boost switching control in the DC/DC converter 5 cannot be properly carried out. This is for the reason that, when the boost switching control is carried out during the performances of the charging switching control and the discharging switching control, the current detected by the resistor R0 is not always the charging current from the reverse-flow preventing diode D0 to the capacitor C0.

In the prior art fuel injection control apparatus, therefore, as shown in FIG. 15, the boost operation of the DC/DC converter 5 (that is, the performance of the boost switching control) is stopped during the performances of the charging switching control and the discharging switching control for driving the piezoelectric actuator 2.

However, in a case where the drive interval Tinj of the piezoelectric actuator 2 (that is, interval of no fuel injection) is shortened, the voltage Vp of the capacitor C0 will fail to rise up to the target value necessary for the drive of the piezoelectric actuator 2, by the next drive timing, and the charged energy Ec of the capacitor C0 might become insufficient by an amount Ei. In addition, when the charged energy of the capacitor C0 becomes insufficient, a response rate at the expansion of the piezoelectric actuator 2 lowers, and in turn, the opening response rate of the injector lowers to incur the worsening of control precision.

Especially in the diesel engine of a vehicle, a diesel common rail system (CRS) wherein fuel of high pressure accumulated in a common rail is injected from the injector is known. In the CRS, multistage injection wherein fuel is injected into one cylinder a plurality of times in a divided manner is executed, thereby to attain the improvement of emission, the reduction of noise and the improvement of fuel consumption. With the prior art technology, however, the charging of the capacitor C0 becomes too late in performing the multistage injection at which the discharging frequency of the capacitor C0 becomes high, and the injector cannot be precisely driven.

SUMMARY OF THE INVENTION

The present invention therefore has an object to provide a piezoelectric actuator drive device including a DC/DC converter of boost type, in which a capacitor stores sufficient charged energy.

According to one aspect of the present invention, a drive device for a piezoelectric actuator and a DC/DC converter therefor comprises a boosting coil fed with a power source voltage at one end thereof, a boost switch connected in series in a path extending between the other end of the boosting coil and a reference potential lower than the power source voltage, a capacitor connected in series in a path extending to the reference potential, a boost controller for performing boost switching control in which the boost switch is turned on and off thereby to charge the capacitor and to generate a voltage higher than the power source voltage at a positive terminal of the capacitor on a side opposite to the reference potential, a charging switch for charging the piezoelectric actuator by stored energy of the capacitor, and a discharging switch for discharging stored charges of the piezoelectric actuator. In this device, the boost switch, the charging switch and the discharging switch are controlled without detection of a charging current which flows to the capacitor.

According to such a drive device, even when the boost switching control is performed during performance of the charging switching control and the discharging switching control for driving the piezoelectric actuator, the boost switching control, the charging switching control and the discharging switching control can be properly performed without interfering with one another, respectively.

Therefore, even during the performances of the charging switching control and the discharging switching control, the capacitor can be charged by performing the boost switching control. It can consequently be avoided that the stored energy of the capacitor becomes insufficient (more specifically, the voltage of the capacitor fails to be raised to a target value by the next drive time point of the piezoelectric actuator).

BRIEF DESCRIPTION OF THE DRAWINGS

The above and other objects, features and advantages of the present invention will become more apparent from the following detailed description made with reference to the accompanying drawings. In the drawings:

FIGS. 13A and 13B are a circuit diagram and a time chart showing prior art fuel injection control apparatus and the operation thereof, respectively;

DESCRIPTION OF THE PREFERRED EMBODIMENTS

First Embodiment

Figure 1:
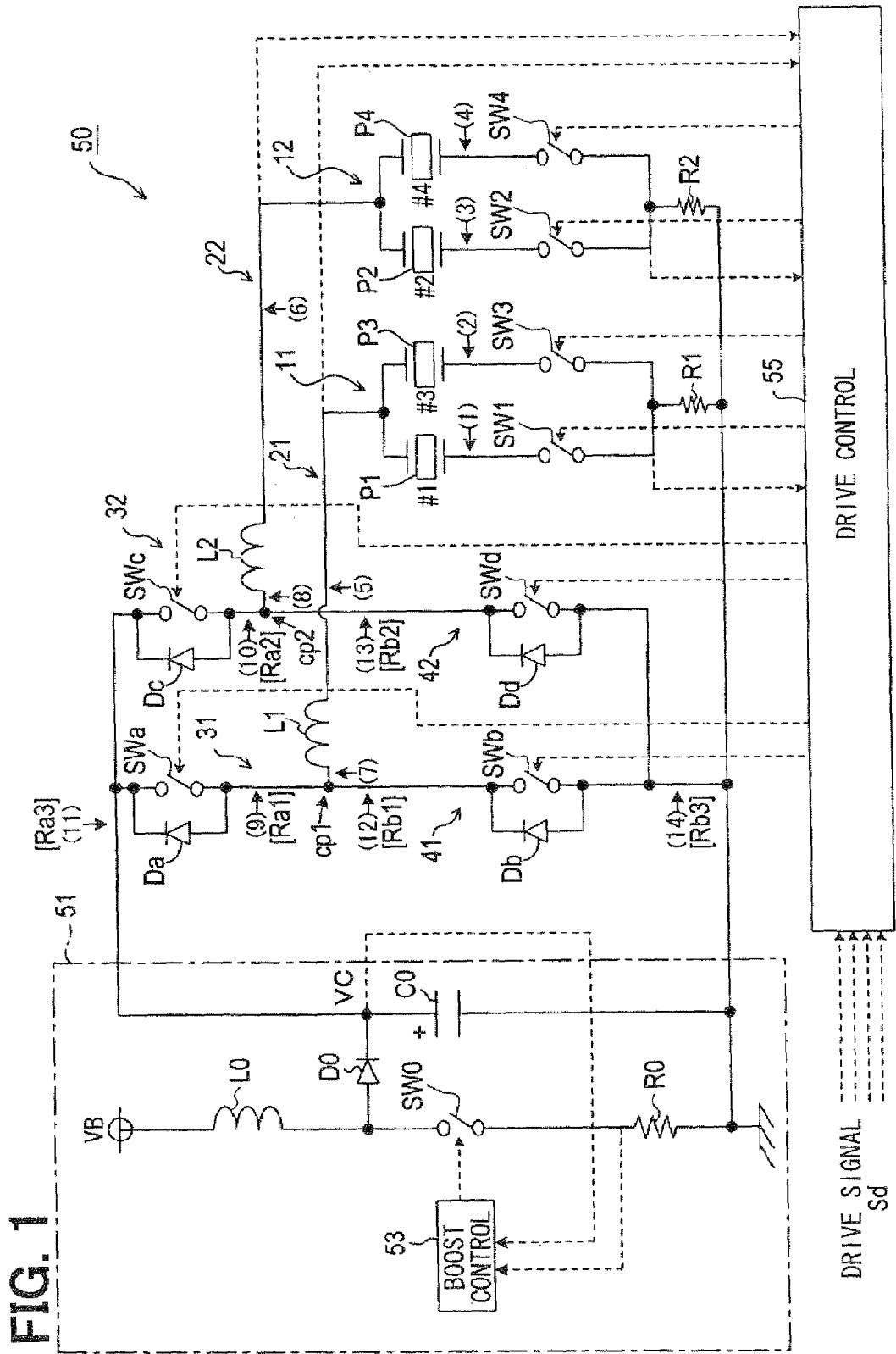
FIG. 1 is a circuit diagram showing a fuel injection control apparatus according to a first embodiment of the present invention.

Referring first to FIG. 1, a fuel injection control apparatus 50 according to a first embodiment controls fuel injections into a diesel engine mounted on a vehicle. Piezoelectric actuators P1 to P4 which are disposed in individual injectors for injecting high-pressure fuel from a common rail into the corresponding cylinders of the diesel engine are charged/discharged to expand/contract, whereby the injectors of the respective cylinders are caused to start/stop the fuel injections. The number of the cylinders of the engine is four, and the piezoelectric actuator Pn (where "n" denotes any of 1 to 4) corresponds to the n-th cylinder (#n). Further, in the fuel injection control apparatus 50, the cylinders of the engine are divided into groups each including two cylinders. The first cylinder (#1) and the third cylinder (#3) form the first group, and the second cylinder (#2) and the fourth cylinder (#4) form the second group.

The fuel injection control apparatus 50 includes as components common to the piezoelectric actuators P1 to P4 of the respective groups, a DC/DC converter 51 which boosts a battery voltage VB (for example, 12 V or 24 V) from an on-vehicle battery and outputs the boosted voltage, and a drive controller 55 which is configured of a microcomputer, a dedicated IC or the like that perform various control for driving the piezoelectric actuators P1 to P4.

When compared with the conventional DC/DC converter 5 shown in FIG. 13A, the DC/DC converter 51 differs in the following two points. It is noted in FIG. 1, the same constituents as in FIG. 13A are designated with the same numerals and signs as used in FIG. 13A.

First, the negative terminal of a capacitor C0 opposite to the side of a diode D0 is connected to the ground potential (ground line) directly and not connected to a resistor R0 for current detection. Therefore, a current flowing through the capacitor C0 does not flow through any resistor, and only a current flowing through a boost switch SW0 flows through the resistor R0.

Second, a boost controller 53 configured of a microcomputer, a dedicated IC or the like starts its operation when an operating power source is closed for the fuel injection control apparatus 50 by, for example, the turn-on of the ignition switch (not shown) of a vehicle. The boost controller 53 performs boost switching control shown in FIG. 2, so that the voltage (capacitor voltage) VC of the capacitor C0 may become a preset target charged voltage.

Figure 2:
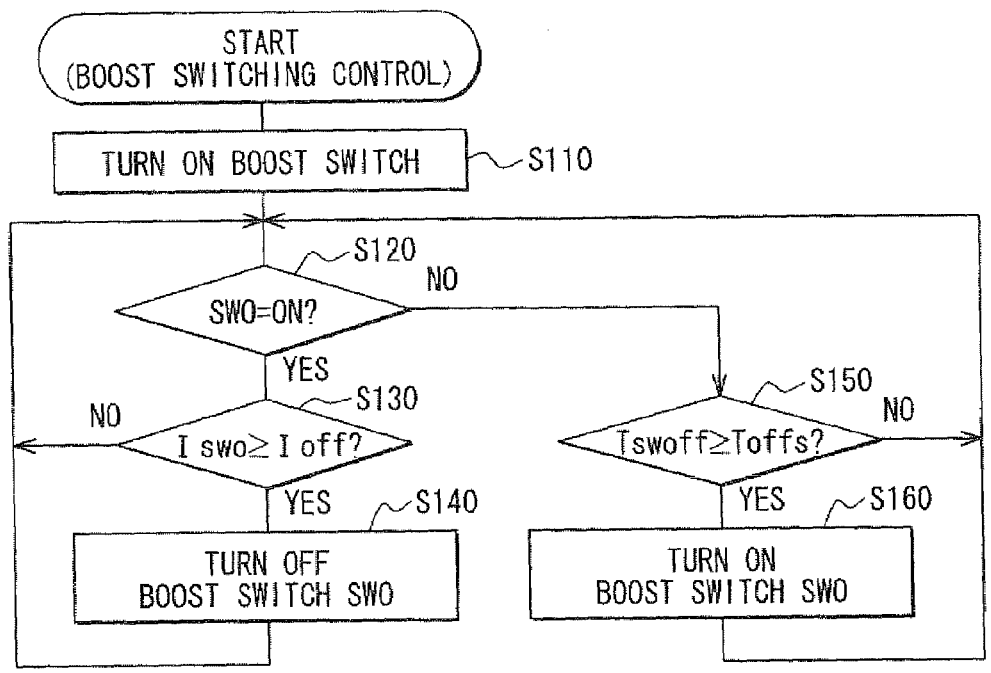
FIG. 2 is a flow chart showing boost switching control in the first embodiment.

More specifically, as shown in FIG. 2, when the boost controller 53 starts the boost switching control, the boost switch SW0 is first turned on (S110).

When the boost switch SW0 is held ON (S120: YES), a current Iswo which is flowing through the boost switch SW0 (the current is also a current which is flowing through a boosting coil L0, and it shall be referred to as a boost switch current) is detected by a voltage generated across the resistor R0, and it is checked whether the boost switch current increases to an OFF changeover threshold value Ioff for the boost switching control (S130: NO). When it is determined that the boost switch current Iswo has increased to the OFF changeover threshold value Ioff (S130: YES), the boost switch SW0 is turned off (S140).

On the other hand, when the boost switch SW0 is held OFF (S120: NO), it is checked whether an OFF elapse time Tswoff which is a time period elapsed since the boost switch SW0 was turned off this time has reached an OFF time set value Toffs for the boost switching control (S150: NO). When it is determined that the OFF elapse time Tswoff has reached the OFF time set value Toffs (S150: YES), the boost switch SW0 is turned on (S160).

The boost controller 53 repeats such operations, thereby to turn on and off the boost switch SW0 repeatedly and to charge the capacitor C0 stepwise. Upon sensing that the monitored capacitor voltage VC has reached the target charged voltage (in this embodiment, 200 V by way of example), the boost controller 53 stops the boost switching control and holds the boost switch SW0 OFF.

In the fuel injection control apparatus 50, the supply voltage is fed from the capacitor C0 to the respective piezoelectric actuators P1 to P4. Therefore, the capacitance of the capacitor C0 is set at a comparatively large value so as to be capable of holding a substantially constant voltage value even when the supply voltage is fed to the piezoelectric actuators P1 to P4.

Further, the fuel injection control apparatus 50 includes a charging/discharging coil L1 which is connected in series with a parallel circuit 11 of the piezoelectric actuators P1 and P3 connected in parallel, a charging path 31 which serves to feed the supply voltage to a series circuit 21 of the charging/discharging coil L1 and the parallel circuit 11, from the positive terminal of the capacitor C0 and through a charging switch SWa, and a discharging path 41 which is connected in parallel with the series circuit 21 and which serves to discharge the stored charges of the piezoelectric actuators P1 and P3 through a discharging switch SWb.

The parallel circuit 11 is configured in such a way that a series circuit of the piezoelectric actuator P1 and a cylinder selection switch SW1 for selecting it as an element to-be-driven, and a series circuit of the piezoelectric actuator P3 and a cylinder selection switch SW3 for selecting it as an element to-be-driven, are connected in parallel. In addition, the end part of the parallel circuit 11 on the side of the piezoelectric actuators P1 and P3 is connected to one end of the charging/discharging coil L1, and the end part of the same on the side of the cylinder selection switches SW1 and SW3 is connected to the ground potential through a resistor R1.

The resistor R1 is a current detecting resistor for detecting currents (charging current and discharging current) which flow through the piezoelectric actuators P1 and P3. The cylinder selection switches SW1 and SW3 are switching elements such as MOSFETs or bipolar transistors.

Figure 14A:
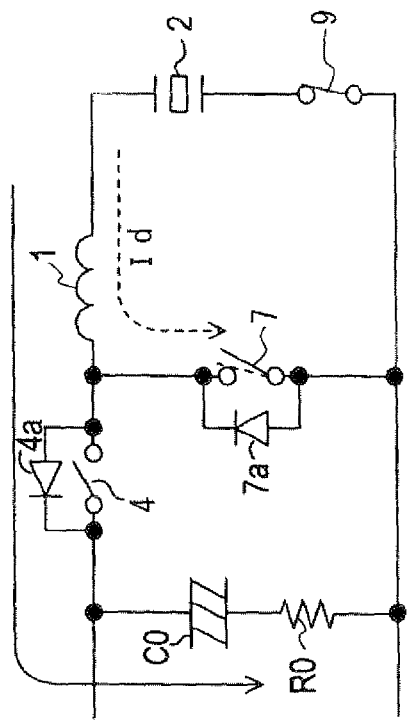
FIGS. 14A to 14D are circuit diagrams showing charging switching control and discharging switching control, and time charts of the charging switching control and the discharging switching control, respectively.
Figure 14B:
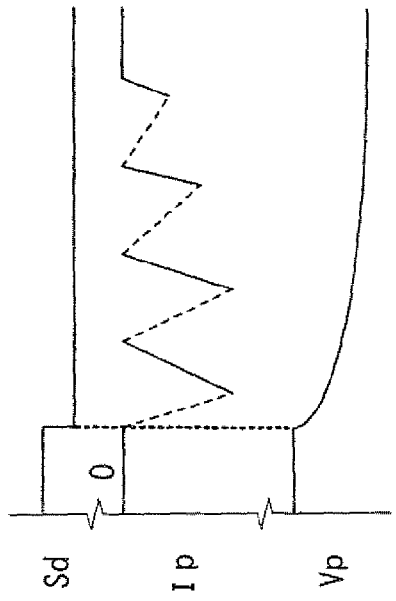
Figure 14C:
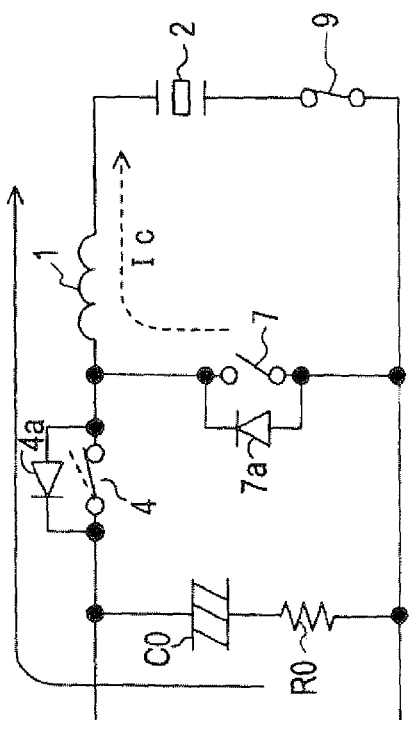
Figure 14D:
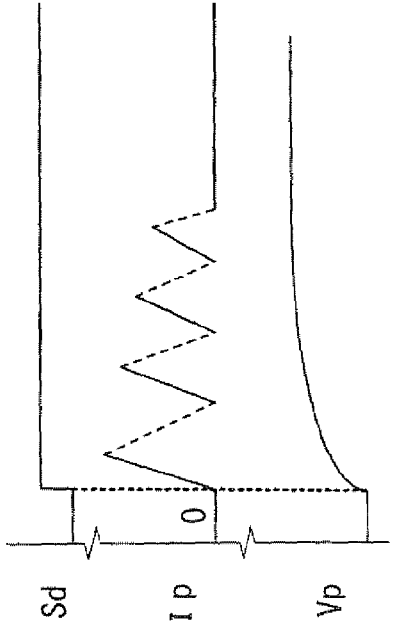
Figure 15:
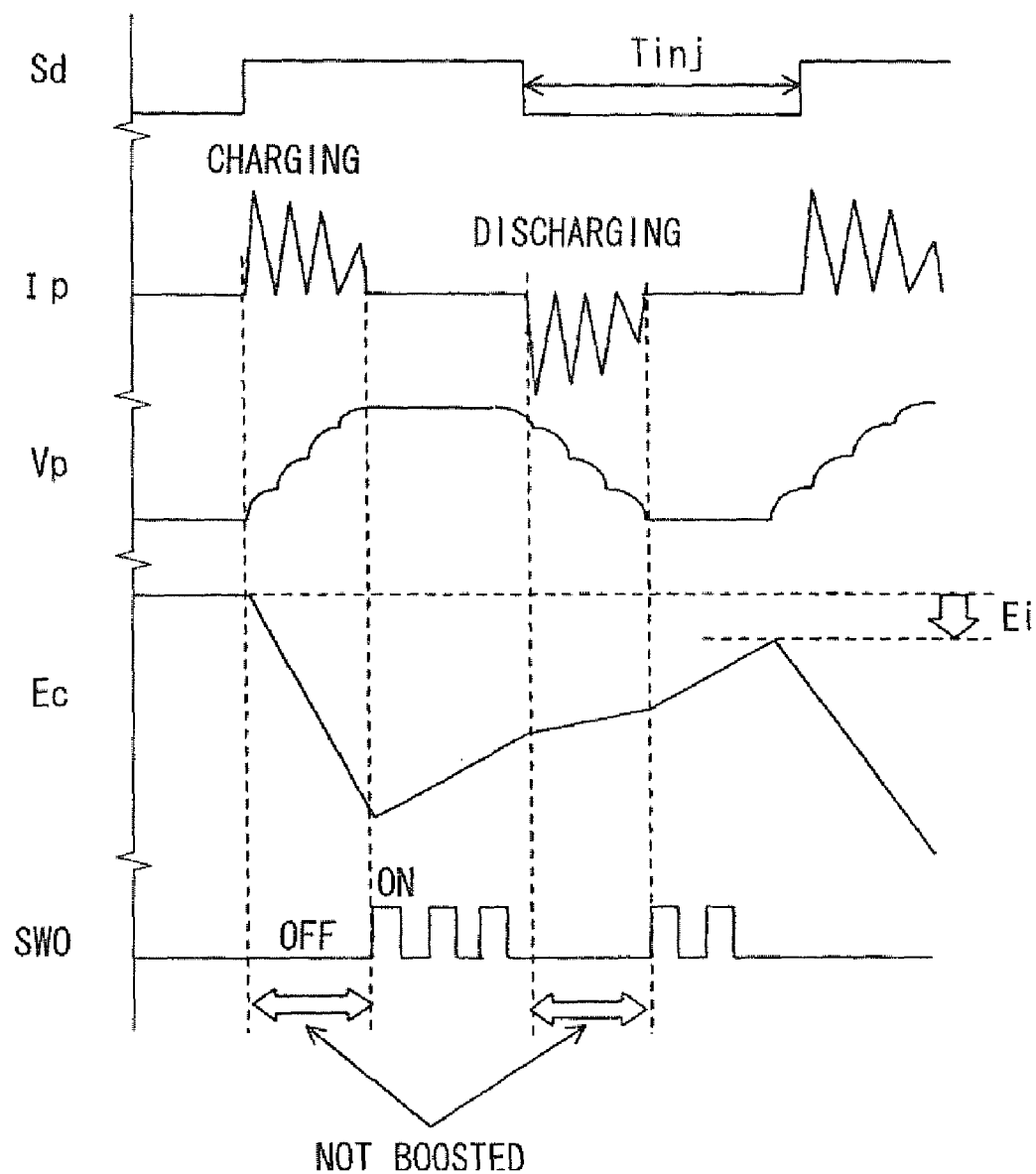
FIG. 15 is a time chart showing the problem of the prior art apparatus.

The end part of the series circuit 21 on the side of the charging/discharging coil L1 is connected to the positive terminal of the capacitor C0 through the charging switch SWa. A diode Da is connected in parallel with the charging switch SWa with its cathode located on the side of the capacitor C0 (with its anode located on the side of the charging/discharging coil L1). In addition, the diode Da allows flow of regenerative current (corresponding to the current indicated by the arrow of the solid line in FIG. 14B) into the capacitor C0 when the discharging switch SWb is turned off from ON in discharging the piezoelectric actuators P1 and P3.

The charging switch SWa is an n-channel MOSFET, the drain of which is connected to the positive terminal of the capacitor C0 and the source of which is connected to the end of the charging/discharging coil L1. The parasitic diode of the MOSFET is utilized as the diode Da.

The discharging switch SWb forms the discharging path 41 by being turned on. This discharging switch SWb is an n-channel MOSFET. In addition, the source of the n-channel MOSFET is connected to the ground potential, and the drain of the same is connected to the node of the charging switch SWa and the charging/discharging coil L1.

Further, a diode Db is connected in parallel with the discharging switch SWb with its cathode located on the side of the charging/discharging coil L1 (with its anode located on the side of the ground potential). In addition, the diode Db allows flow of flywheel current based on the charging/discharging coil L1 (corresponding to the current indicated by the arrow of the broken line in FIG. 14A), when the charging switch SWa is turned off from ON in charging the piezoelectric actuators P1 and P3. The diode Db is the parasitic diode of the MOSFET which forms the discharging switch SWb.

The fuel injection control apparatus 50 includes components which are quite similar to the components for the piezoelectric actuators P1 and P3, regarding the piezoelectric actuators P2 and P4 of the second group.

More specifically, the fuel injection control apparatus 50 includes a charging/discharging coil L2 which is connected in series with a parallel circuit 12 of the piezoelectric actuators P2 and P4 connected in parallel, a charging path 32 which serves to feed the supply voltage to a series circuit 22 of the charging/discharging coil L2 and the parallel circuit 12, from the positive terminal of the capacitor C0 and through a charging switch SWc, and a discharging path 42 which is connected in parallel with the series circuit 22 and which serves to discharge the stored charges of the piezoelectric actuators P2 and P4 through a discharging switch SWd.

The parallel circuit 12 is configured in such a way that a series circuit of the piezoelectric actuator P2 and a cylinder selection switch SW2 for selecting it as an element to-be-driven, and a series circuit of the piezoelectric actuator P4 and a cylinder selection switch SW4 for selecting it as an element to-be-driven, are connected in parallel. In addition, the end part of the parallel circuit 12 on the side of the piezoelectric actuators P2 and P4 is connected to one end of the charging/discharging coil L2, and the end part thereof on the side of the cylinder selection switches SW2 and SW4 is connected to the ground potential through a resistor R2.

The resistor R2 is a current detecting resistor for detecting currents (charging current and discharging current) which flow through the piezoelectric actuators P2 and P4. The cylinder selection switches SW2 and SW4 are switching elements such as MOSFETs or bipolar transistors.

The end part of the series circuit 22 on the side of the charging/discharging coil L2 is connected to the positive terminal of the capacitor C0 through the charging switch SWc. A diode Dc is connected in parallel with the charging switch SWc with its cathode located on the side of the capacitor C0 (with its anode located on the side of the charging/discharging coil L2). In addition, the diode Dc allows flow of regenerative current into the capacitor C0 when the discharging switch SWd is turned off from ON in discharging the piezoelectric actuators P2 and P4.

The charging switch SWc is made of an n-channel MOSFET, the drain of which is connected to the positive terminal of the capacitor C0 and the source of which is connected to the other end of the charging/discharging coil L2. In addition, the parasitic diode of the MOSFET is utilized as the diode Dc.

The discharging switch SWd forms the discharging path 42 by being turned on. The discharging switch SWd is made of an n-channel MOSFET. The source of the n-channel MOSFET is connected to the ground potential, and the drain of the same is connected to the node of the charging switch SWc and the charging/discharging coil L2.

Further, a diode Dd is connected in parallel with the discharging switch SWd with its cathode located on the side of the charging/discharging coil L2 (with its anode located on the side of the ground potential). In addition, the diode Dd allows flow of flywheel current based on the charging/discharging coil L2, when the charging switch SWc is turned off from ON in charging the piezoelectric actuators P2 and P4. The diode Dd is the parasitic diode of the MOSFET which forms the discharging switch SWd.

In the fuel injection control apparatus 50, the drive controller 55 controls the charging switches SWa and SWc, the discharging switches SWb and SWd, and the cylinder selection switches SW1 to SW4. The drive controller 55 controls these switches as follows.

First, the drive controller 55 monitors the voltages of the resistors R1 and R2 or the terminal voltages of the resistors R1 and R2, thereby to detect the charging currents and the discharging currents which flow through the piezoelectric actuators being the elements to-be-driven. The drive controller 55 detects the charged voltages (piezoelectric voltages) of the piezoelectric actuators being the elements to-be-driven, by the voltages of the end parts of the parallel circuits 11 and 12 on the sides of the charging/discharging coils L1 and L2. Further, the drive signals (injection command signals) Sd of the respective cylinders for opening the injectors of these cylinders are inputted from an electronic control unit or a microcomputer (not shown) for executing the processing of an engine control, to the drive controller 55. In a case where the fuel injection control apparatus 50 is disposed in the electronic control unit, the drive signals Sd of the respective cylinders are inputted from the microcomputer within the electronic control unit, to the drive controller 55.

Here, a case where the piezoelectric actuator P1 of the cylinder #1 is the element to-be-driven will be described as an example below.

Figure 3:
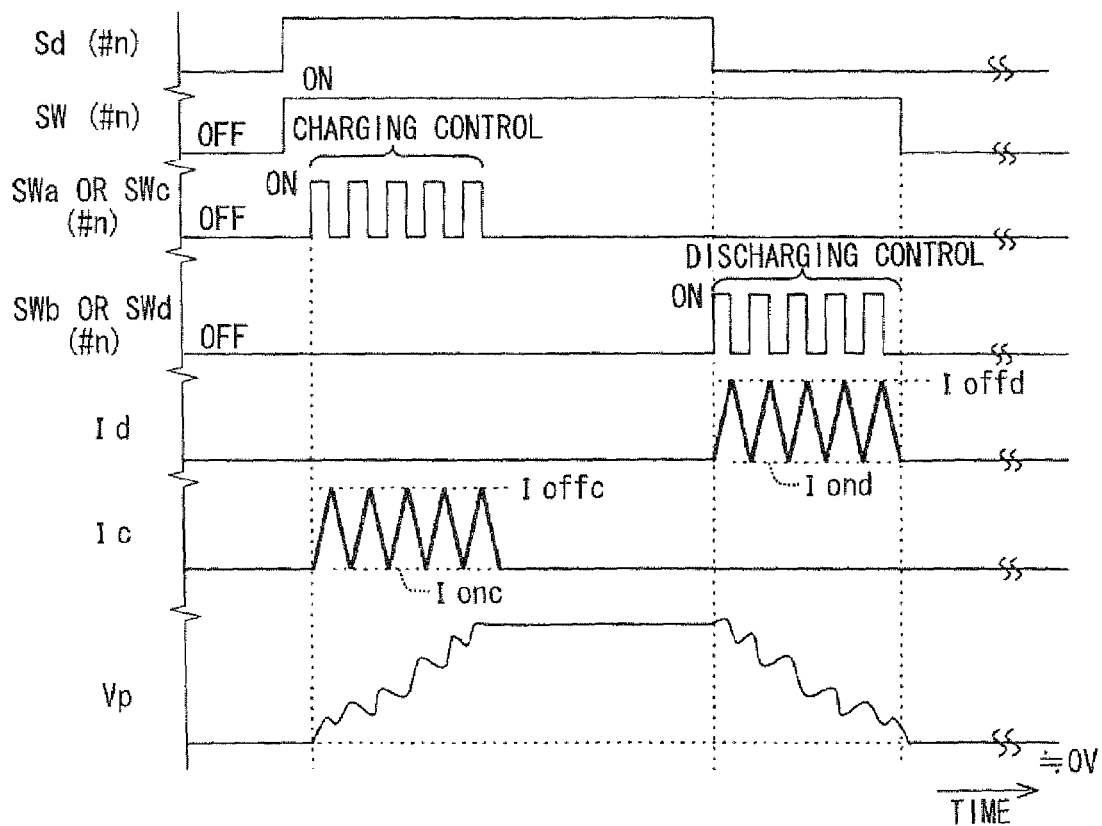
FIG. 3 is a time chart showing operation of a drive controller in the first embodiment.

As shown in FIG. 3, when the drive signal Sd of the cylinder #1 becomes high, the drive controller 55 performs a charging switching control in which the charging switch SWa for the first one of the two groups is turned on and off, in a state where the cylinder selection switch SW1 corresponding to the cylinder #1 is turned on among the cylinder selection switches SW1 to SW4 and where the discharging switch SWb for the first group to which the cylinder #1 belongs is turned off.

In the ON period of the charging switch SWa, the charging current Ic flows from the capacitor C0 to the piezoelectric actuator P1 through the charging path 31 and the charging/discharging coil L1. In the OFF period of the charging switch SWa, the charging current Ic which flows due to energy stored in the charging/discharging coil L1 flows from the ground potential side to the piezoelectric actuator P1 through the diode Db parallel to the discharging switch SWb. In addition, due to such a charging switching control, the piezoelectric actuator P1 is charged and expanded stepwise, and the injector of the cylinder #1 is opened.

Figure 4A:
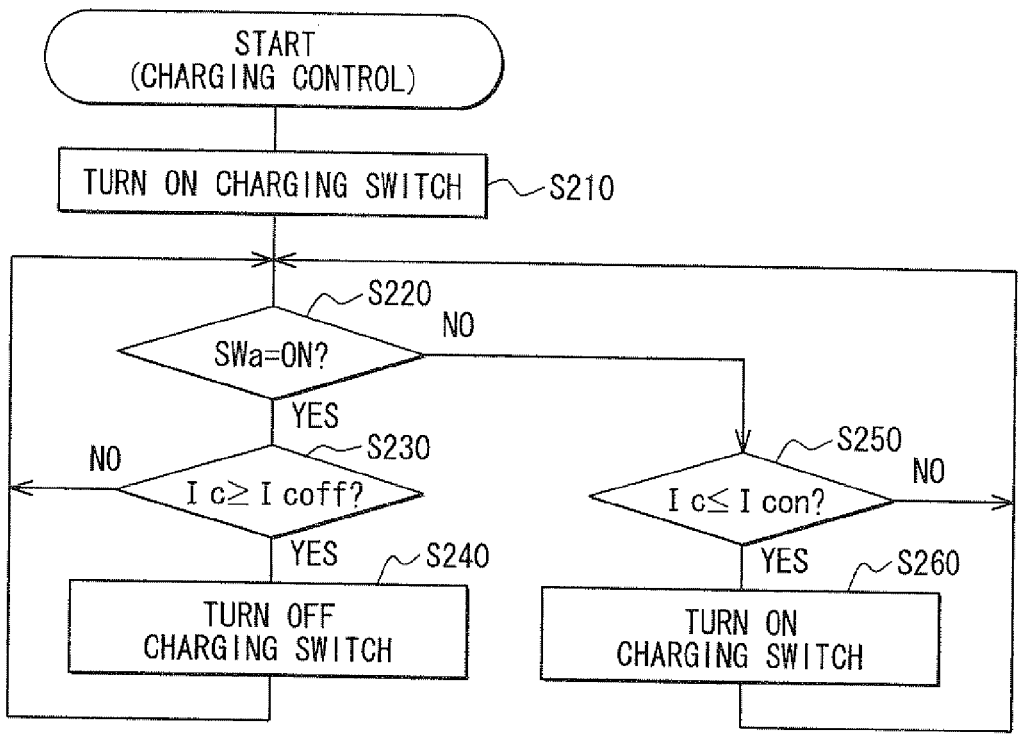
FIGS. 4A and 4B are flow charts showing charging switching control and discharging switching control in the first embodiment, respectively.

In this charging switching control, as shown in FIG. 4A, when the drive controller 55 starts the charging switching control to start fuel injection, it first turns on the charging switch SWa (S210).

When the charging switch SWa is held ON (S220: YES), it is checked whether the charging current Ic of the piezoelectric actuator P1 as is detected by the voltage generated across the resistor R1 increases to an OFF changeover threshold value Icoff for the charging switching control (S230: NO). When it is determined that the charging current Ic has increased to the OFF changeover threshold value Icoff (S230: YES), the charging switch SWa is turned off (S240).

On the other hand, when the charging switch SWa is held OFF (S220: NO), it is checked whether the charging current Ic of the piezoelectric actuator Pt as is detected by the voltage generated across the resistor R1 decreases to an ON changeover threshold value Icon for the charging switching control (S250: NO). In addition, when it is determined that the charging current has decreased to the ON changeover threshold value Icon (S250: YES), the charging switch SWa is turned on (S260).

The charging switching control in FIG. 4A corresponds to the control pattern Ac. When the drive controller 55 determines that the charged voltage Vp of the piezoelectric actuator P1 being the element to-be-driven has become, at least, a charging-end target value capable of reliably opening the injector, in performing the charging switching control, it ends the charging switching control and holds the charging switch SWa in the OFF state thereof.

Thereafter, as shown in FIG. 3, when the drive signal of the cylinder #1 reverts from the high level to the low level to stop fuel injection, the drive controller 55 performs discharging switching control in which the discharging switch SWb for the first group is turned on and off, in a state where the charging switch SWa for the first group to which the cylinder #1 belongs is turned off.

In the ON period of the discharging switch SWb, the discharging current Id flows from the positive side of the piezoelectric actuator P1 to the ground potential side through the charging/discharging coil L1 and the discharging path 41, In the OFF period of the discharging switch SWb, the discharging current flows from the positive side of the piezoelectric actuator P1 to the capacitor C0 through the charging/discharging coil L1 and the diode Da parallel to the charging switch SWa. Thus, the charges of the piezoelectric actuator P1 are recovered into the capacitor C0 by this discharging current. In addition, due to such a discharging switching control, the piezoelectric actuator P1 is discharged and contracted stepwise, and the injector of the cylinder #1 is closed.

Figure 4B:
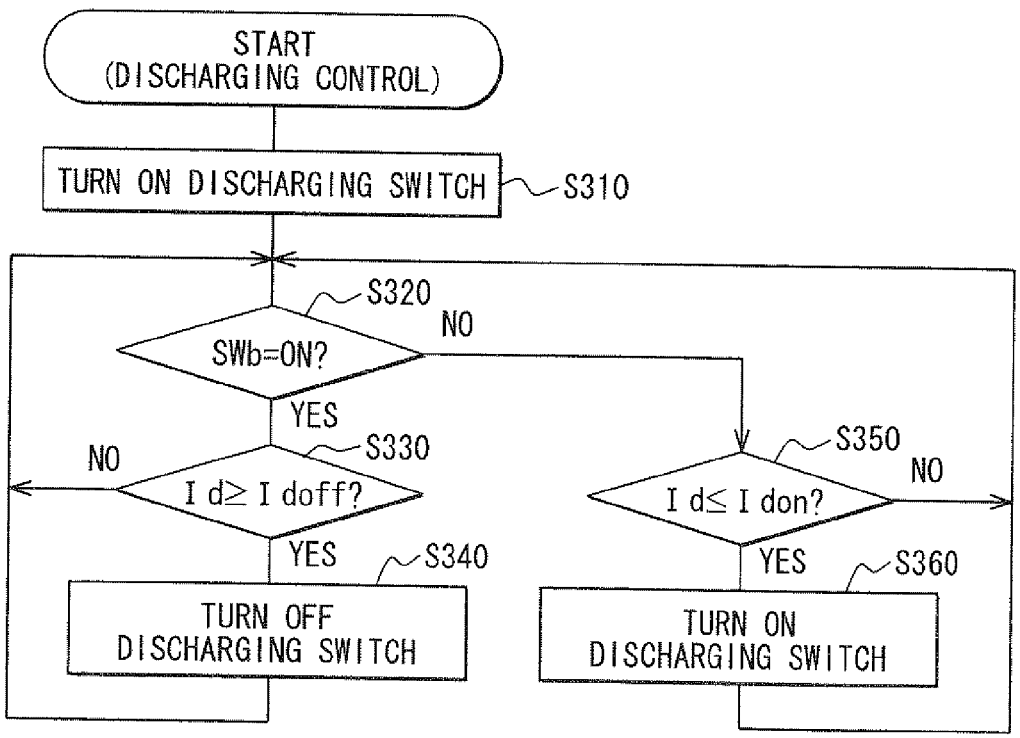

In the discharging switching control, as shown in FIG. 4B, when the drive controller 55 starts the discharging switching control, it first turns on the charging switch SWb (S310).

In addition, when the discharging switch SWb is held ON (S320: YES), it is checked whether the discharging current Id of the piezoelectric actuator P1 as is detected by the voltage generated across the resistor R1 increases to an OFF changeover threshold value Idoff for the discharging switching control (S330: NO). When it is determined that the discharging current Id has increased to the OFF changeover threshold value Idoff (S330: YES), the discharging switch SWb is turned off (S340).

On the other hand, when the discharging switch SWb is held OFF (S320: NO), it is checked whether the discharging current Id of the piezoelectric actuator P1 as is detected by the voltage generated across the resistor R1 decreases to an ON changeover threshold value Idon for the discharging switching control (S350: NO). When it is determined that the discharging current Id has decreased to the ON changeover threshold value Idon (S350: YES), the discharging switch SWb is turned on (S360).

The discharging switching control in FIG. 4B corresponds to the control pattern Ad. When the drive controller 55 determines that the charged voltage Vp of the piezoelectric actuator P1 being the element to-be-driven has become, at most, a discharging-end target value set at substantially 0 V, in performing the discharging switching control, it ends the discharging switching control, holds the discharging switch SWb in the OFF state and turns off the cylinder selection switch SW1 having been held ON till then.

In a case where the piezoelectric actuator P3 of the cylinder #3 is driven, the cylinder selection switch SW3 is turned on instead of the cylinder selection switch SW1 and the switches SWa and SWb are controlled in the similar manner. In cases where the piezoelectric actuators P2 and P4 are driven by turning on the selection switch SW2 or SW4, the charging switch SWc and the discharging switch SWd are controlled in the similar manner as the switches SWa and SWb.

In the fuel injection control apparatus 50, the current of the capacitor C0 does not flow through the current detecting resistor R0 which the boost controller 53 of the DC/DC converter 51 employs for performing the boost switching control, and the boost controller 53 performs the boost switching control without detecting the charging current from the reverse-flow preventing diode D0 to the capacitor C0.

The current detecting resistor R1, which the drive controller 55 employs for performing the charging switching control and the discharging switching control for driving the piezoelectric actuator P1 or P3, is located in a current path which extends from the node cp1 of the charging switch SWa, the discharging switch SWb and the charging/discharging coil L1, to the ground potential via the charging/discharging coil L1 and the piezoelectric actuator P1 or P3. This current detecting resistor R1 serves to detect a current flowing in the current path, as the current flowing through the piezoelectric actuator P1 or P3.

Likewise, the current detecting resistor R2 which the drive controller 55 employs for performing the charging switching control and the discharging switching control for driving the piezoelectric actuator P2 or P4 is located in a current path which extends from the node cp2 of the charging switch SWc, the discharging switch SWd and the charging/discharging coil L2, to the ground potential via the charging/discharging coil L2 and the piezoelectric actuator P2 or P4. This current detecting resistor R2 serves to detect a current flowing in the current path, as the current flowing through the piezoelectric actuator P2 or P4.

Consequently, the drive controller 55 performs the charging switching control and the discharging switching control without detecting the charging current, which flows from the reverse-flow preventing diode D0 to the capacitor C0.

Figure 5:
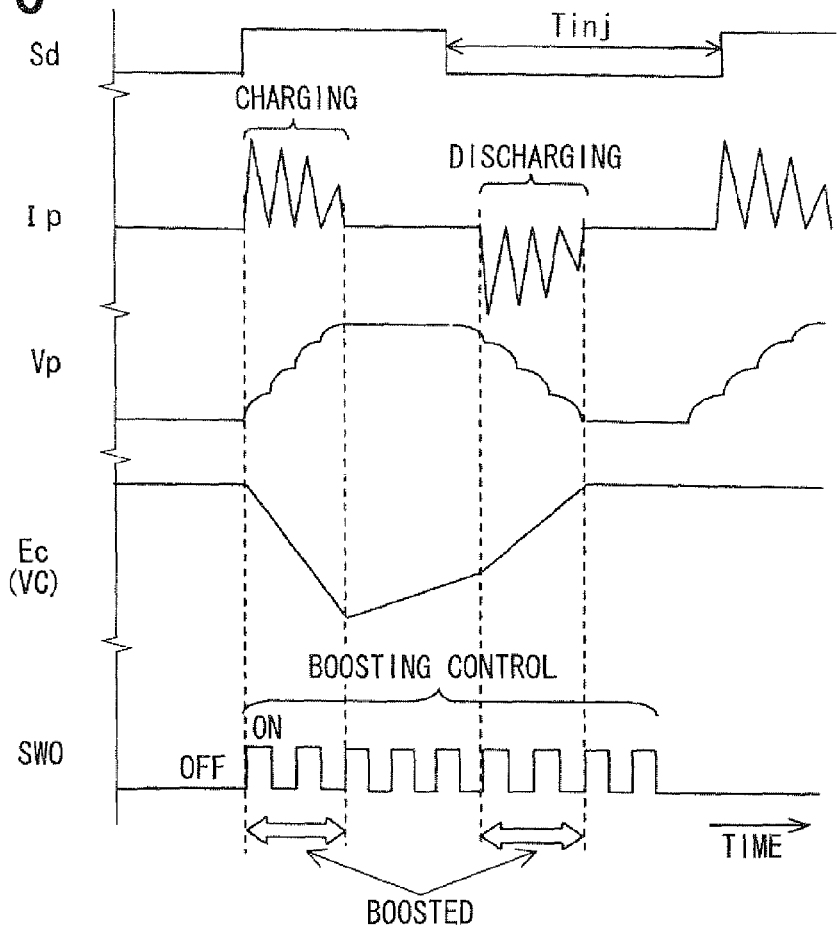
FIG. 5 is an explanatory diagram showing advantage of the fuel injection control in the first embodiment.

Therefore, as shown in FIG. 5, even when the boost switching control (the boost operation of the DC/DC converter 5) is performed during the performances of the charging switching control and the discharging switching control for driving the piezoelectric actuator Pn (where "n" is any of 1 to 4), the boost switching control, the charging switching control and the discharging switching control can be properly performed separately, respectively.

For this reason, the capacitor C0 can be charged even during the performances of the charging switching control and the discharging switching control, and it is avoidable that the charged energy of the capacitor C0 becomes insufficient (more specifically, that the capacitor voltage VC cannot be raised to the target value by the next drive time point of the piezoelectric actuator Pn).

As compared with the prior art apparatus, the apparatus 50 can lessen the lowering of the capacitor voltage VC during the charging switching control, and it can enlarge the rise of the capacitor voltage VC during the discharging switching control. Therefore, even in a case where multistage injection is executed, necessary energy can be stored in the capacitor C0 by the execution of the next fuel injection.

In the first embodiment, the boost controller 53 corresponds to boost control means, and the drive controller 55 corresponds to charging/discharging control means. The diodes Da and Dc correspond to first diodes, and the diodes Db and Dd correspond to second diodes. The drive signal Sd of the high level corresponds to a drive command, and the drive signal Sd of the low level corresponds to a drive stop command. In addition, the resistor R0 corresponds to boost switch current detection means, and the resistors R1 and R2 correspond to piezoelectric actuator current detection means.

In the first embodiment, the resistor R0 may be disposed in a current path which extends from the battery voltage VB to the ground potential via the boosting coil L0 and the boost switch SW0. It may well be interposed between the battery (voltage VB) and the boosting coil L0 or between the boosting coil L0 and the boost switch SW0. In such a case, the current may be detected by detecting the terminal voltage of the resistor R0 with a differential amplifier or the like.

The resistor R1 or R2 may be disposed at a position capable of detecting the current flowing through the piezoelectric actuator Pn, without detecting the charging current which flows from the reverse-flow preventing diode D0 to the capacitor C0. it may be disposed at any position in the current path which extends from the node cp1 or cp2 to the ground potential via the corresponding charging/discharging coil L1 or L2 and the piezoelectric actuator Pn. Specifically, the resistor R1 may have its components disposed at respective positions (1) and (2) in FIG. 1. Alternatively, it may be disposed at a position (5) or a position (7). Likewise, the resistor R2 may have its components disposed at respective positions (3) and (4) in FIG. 1. Alternatively, it may be disposed at a position (6) or a position (8).

Second Embodiment

Figure 6:
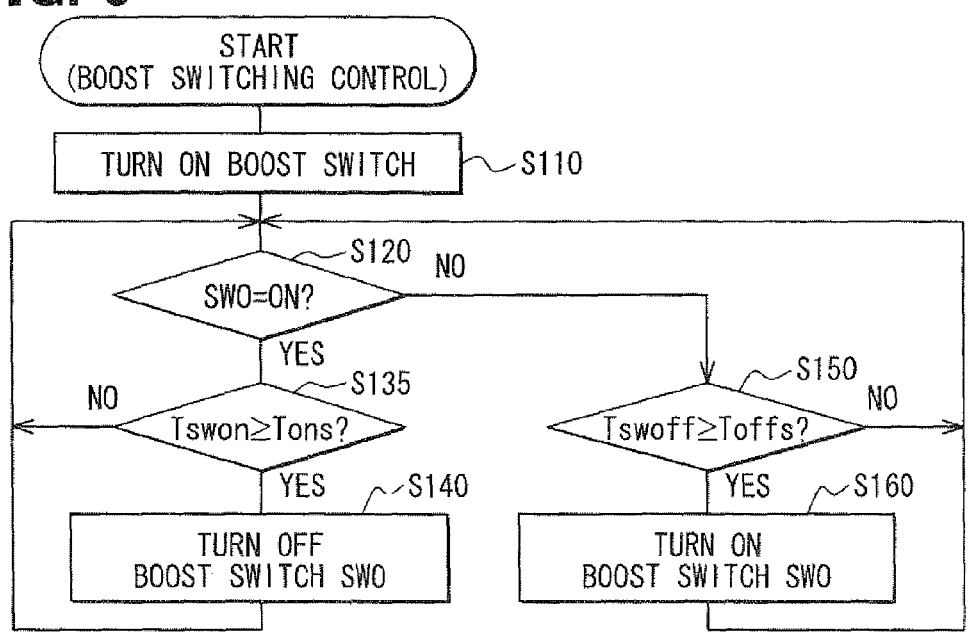
FIG. 6 is a flow chart showing boost switching control in a second embodiment of the present invention.

The fuel injection control apparatus 50 in a second embodiment differs from the first embodiment in that the boost controller 53 of the DC/DC converter 51 performs boost switching control shown in FIG. 6 instead of the boost switching control shown in FIG. 2.

Specifically, the boost switching control in FIG. 6 executes S135 instead of S130 in FIG. 2.

More specifically, when the boost switch SW0 is held ON (S120: YES), it is checked whether an ON elapse time Tswon which is a time period elapsed since the boost switch SW0 was turned on this time has reached an ON time set value Tons for the boost switching control (S135: NO). When it is determined that the ON elapse time Tswon has reached the ON time set value Tons (S135: YES), the boost switch SW0 is turned off (S140). That is, not only the OFF period of the boost switch SW0, but also ON period thereof is controlled by only the time period.

Thus, in the second embodiment, the same advantages as in the fuel injection control apparatus 50 of the first embodiment are attained. Moreover, in the case of the second embodiment, the resistor R0 for the current detection can be omitted.

In both the first and the second embodiments, the charging and discharging switching control shown in FIGS. 4A and 4B may be modified as in the following examples.

First Example

Figure 7A:
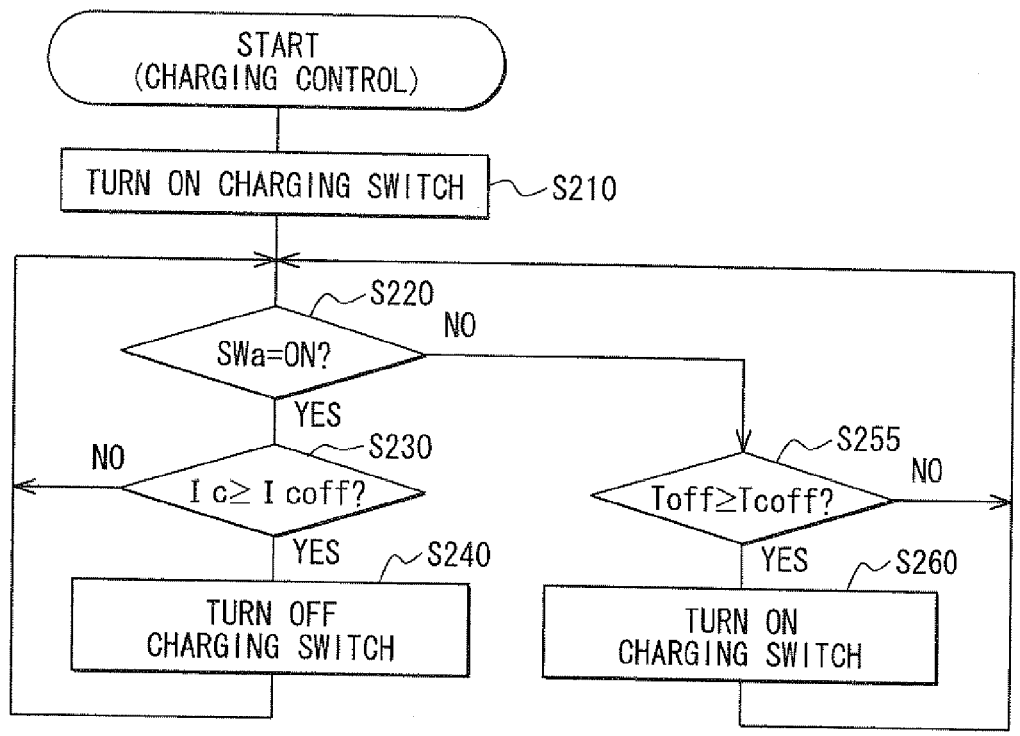
FIGS. 7A and 7B are flow charts showing charging switching control in a first example and discharging switching control in a second example, respectively.

The charging switching control in FIG. 4A may well be replaced with a charging switching control shown in FIG. 7A.

The charging switching control in FIG. 7A differs in that S255 is executed instead of S250.

More specifically, when the charging switch SWa or SWc is held OFF (S220: NO), it is checked whether an OFF elapse time Toff which is an elapsed time period since the charging switch SWa or SWc was turned off this time has reached an OFF time set value Tcoff for the charging switching control (S255: NO). When it is determined that the OFF elapse time Toff has reached the OFF time set value Tcoff (S255: YES), the charging switch SWa or SWc is turned on (S260).

That is, in the charging switching control in FIG. 7A, the ON period of the charging switch SWa or SWc is controlled on the basis of the charging current of the piezoelectric actuator Pn as is detected by the resistor R1 or R2, but the OFF period of the charging switch SWa or SWc is controlled based on the time. This charging switching control corresponds to the control pattern Bc.

Second Example

Figure 7B:
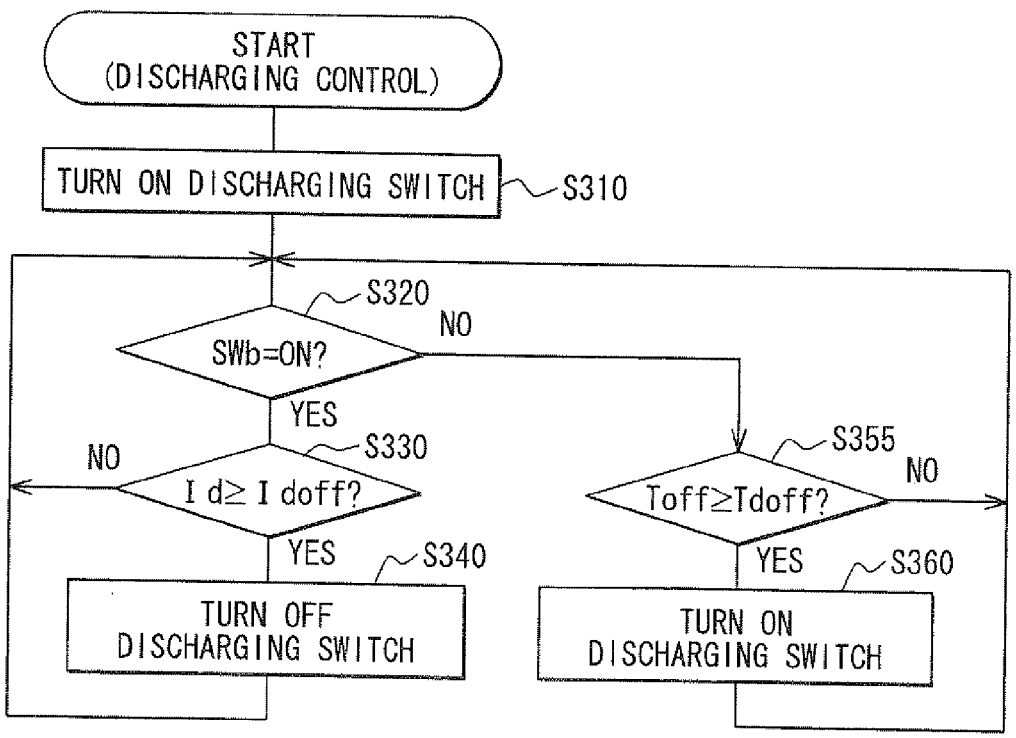

The discharging switching control in FIG. 4B may well be replaced with a discharging switching control shown in FIG. 7B.

The discharging switching control in FIG. 7B differs in that step S355 is executed instead of S350.

More specifically, when the discharging switch SWb or SWd is held OFF (S320: NO), it is checked whether an OFF elapse time Toff which is an elapsed time period since the discharging switch SWb or SWd was turned off this time has reached an OFF time set value Tdoff for the discharging switching control (S355: NO). When it is determined that the OFF elapse time Toff has reached the OFF time set value Tdoff (S355: YES), the discharging switch SWb or SWd is turned on (S360).

That is, in the discharging switching control in FIG. 7B, the ON period of the discharging switch SWb or SWd is controlled on the basis of the discharging current of the piezoelectric actuator Pn as is detected by the resistor R1 or R2, but the OFF period of the discharging switch SWb or SWd is controlled based on the time. This discharging switching control corresponds to the control pattern Bd.

Third Example

Figure 8A:
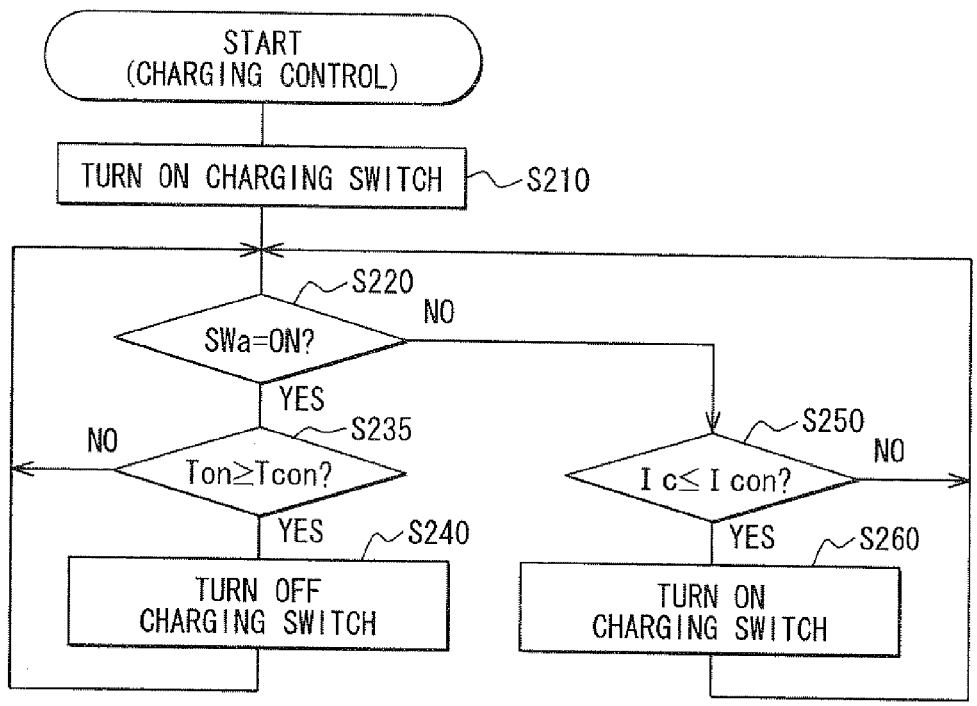
FIGS. 8A and 8B are flow charts showing charging switching control in a third example and discharging switching control in a fourth example, respectively.

The charging switching control in FIG. 4A may well be replaced with a charging switching control shown in FIG. 8A.

The charging switching control in FIG. 8A differs in that S235 is executed instead of S230.

More specifically, when the charging switch SWa or SWc is held ON (S220: YES), it is checked whether an ON elapse time Ton which is an elapsed time period since the charging switch SWa or SWc was turned on this time has reached an ON time set value Tcon for the charging switching control (S235: NO). When it is determined that the ON elapse time Ton has reached the ON time set value Tcon (S235: YES), the charging switch SWa or SWc is turned off (S240).

That is, in the charging switching control in FIG. 8A, the OFF period of the charging switch SWa or SWc is controlled on the basis of the charging current of the piezoelectric actuator Pn as is detected by the resistor R1 or R2, but the ON period of the charging switch SWa or SWc is controlled based on the time. This charging switching control corresponds to the control pattern Cc.

Fourth Example

Figure 8B:
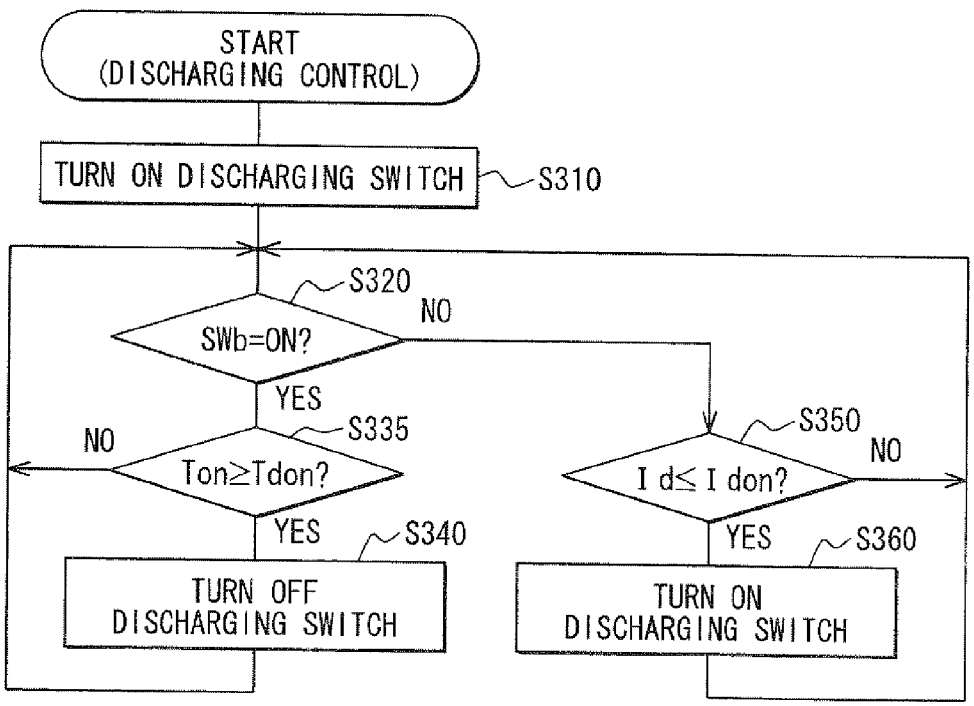

The discharging switching control in FIG. 4B may well be replaced with a discharging switching control shown in FIG. 8B.

The discharging switching control in FIG. 8B differs in that S335 is executed instead of S330.

More specifically, when the discharging switch SWb or SWd is held ON (S320: YES), it is checked whether an ON elapse time Ton which is an elapsed time period since the discharging switch SWb or SWd was turned on this time has reached an ON time set value Tdon for the discharging switching control (S335: NO). When it is determined that the ON elapse time Ton has reached the ON time set value Tdon (S335: YES), the discharging switch SWb or SWd is turned off (S340).

That is, in the discharging switching control in FIG. 8B, the OFF period of the discharging switch SWb or SWd is controlled on the basis of the discharging current of the piezoelectric actuator Pn as is detected by the resistor R1 or R2, but the ON period of the discharging switch SWb or SWd is controlled based on the time. This discharging switching control corresponds to the control pattern Cd.

Fifth Example

Figure 9A:
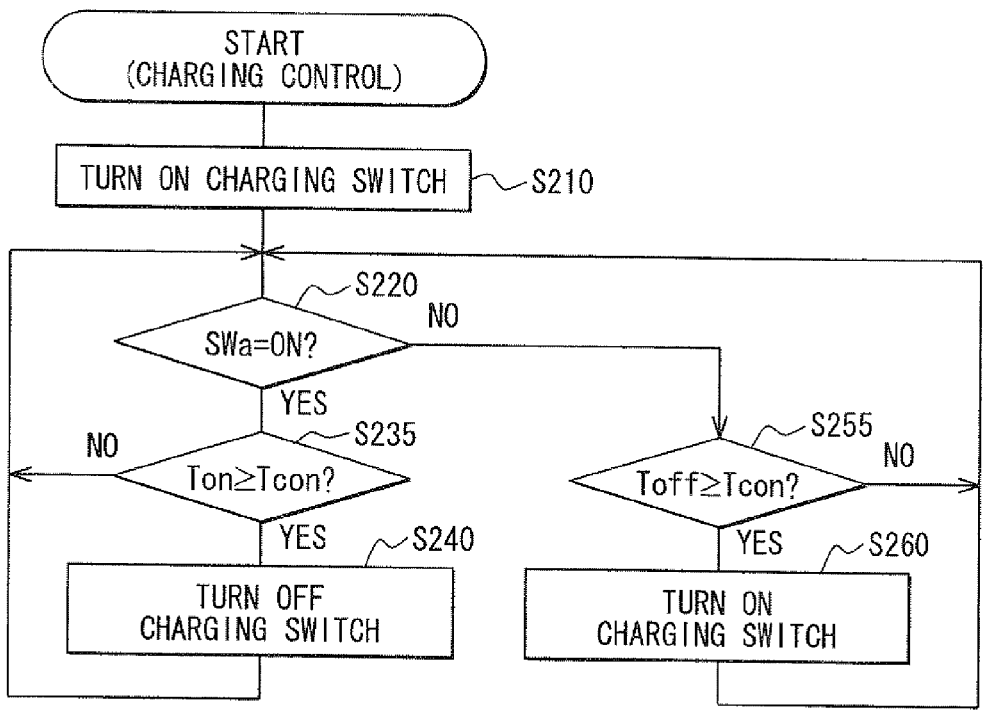
FIGS. 9A and 9B are flow charts showing charging switching control in a fifth example and discharging switching control in a sixth example, respectively.

The charging switching control shown in FIG. 4A may well be replaced with a charging switching control shown in FIG. 9A.

The charging switching control in FIG. 9A differs in that the same determination of S235 as in the charging switching control in FIG. 8A is executed instead of S230, and that the same determination of S255 as in the charging switching control in FIG. 7A is executed instead of S250.

That is, in the charging switching control in FIG. 9A, both the ON period and Ton the OFF period Toff of the charging switch SWa or SWc are controlled based on the times. This charging switching control corresponds to the control pattern Dc.

Sixth Example

Figure 9B:
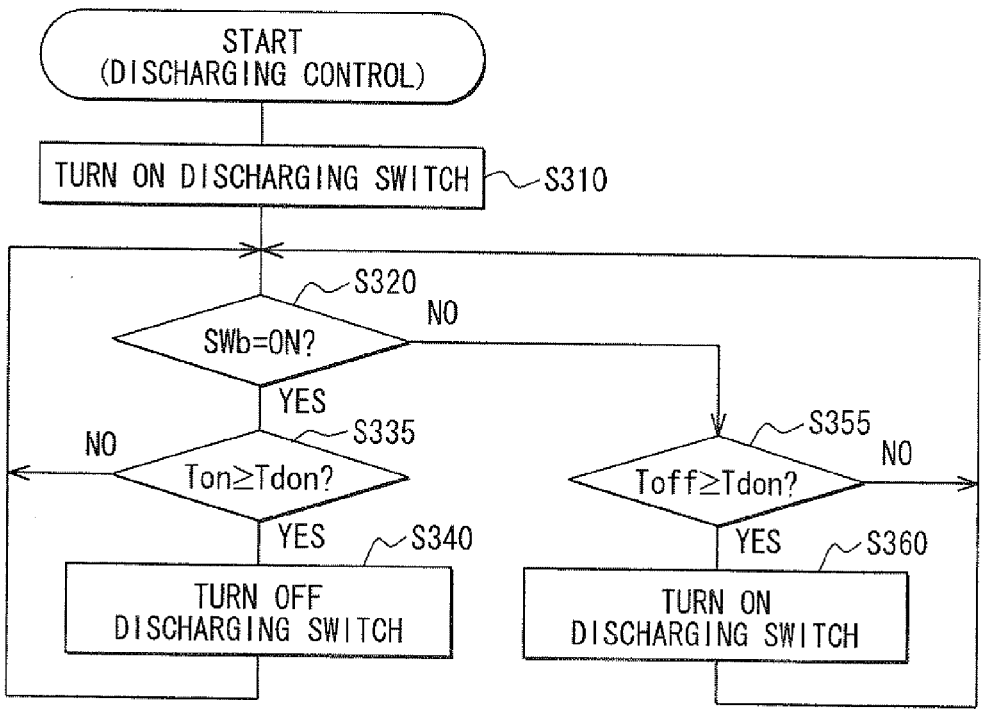

The discharging switching control shown in FIG. 4B may well be replaced with a discharging switching control shown in FIG. 9B.

The discharging switching control in FIG. 9B differs in that the same determination of S335 as in the discharging switching control in FIG. 8B is executed instead of S330, and that the same determination of S355 as in the discharging switching control in FIG. 7B is executed instead of S350.

That is, in the discharging switching control in FIG. 9B, both the ON period Ton and the OFF period Toff of the discharging switch SWb or SWd are controlled based on the times. This discharging switching control corresponds to the control pattern Dd.

If the respective control in FIG. 9A and FIG. 9B are performed as the charging switching control and the discharging switching control, the resistors R1 and R2 for the current detection can be omitted.

Besides, the four sorts of discharging switching control in FIG. 4B, FIG. 7B, FIG. 8B and FIG. 9B can be respectively combined with the four sorts of charging switching controls in FIG. 4A, FIG. 7A, FIG. 8A and FIG. 9A.

Seventh Example

The fuel injection control apparatus 50 can also be configured so that the charging current of the piezoelectric actuator Pn as is determined at S230 in FIG. 4A or FIG. 7A may be detected by any resistor other than the resistor R1 or R2.

By way of example, it is also allowed to dispose resistors for current detection (resistors Ra1 and Ra2), at respective positions (9) and (10) in FIG. 1, and to determine whether the charging current of the piezoelectric actuator Pn as is detected by the resistor Ra1 or Ra2 has increased to the OFF changeover threshold value Icoff, at S230.

Besides, the resistors Ra1 and Ra2 may be respectively disposed at any positions in current paths which extend from the node of the cathode of the reverse-flow preventing diode D0 and the positive terminal of the capacitor C0 to the nodes cp1 and cp2 via the charging switches SWa and SWc. By way of example, therefore, the resistors Ra1 and Ra2 may be respectively disposed on the higher potential sides of the charging switches SWa and SWc, or a single resistor (resistor Ra3) may well be disposed at a position (11) in FIG. 1 in place of the resistors Ra1 and ra2.

The resistors Ra1, Ra2 and Ra3 correspond to charging path current detection means. Besides, the resistors R1 and R2 are dispensed with in case of performing the charging switching control in FIG. 7A and the discharging switching control in FIG. 9B if this seventh example is implemented.

Eighth Example

The fuel injection control apparatus 50 can also be configured so that the discharging current of the piezoelectric actuator Pn as is determined at S330 in FIG. 4B or FIG. 7B may be detected by any resistor other than the resistor R1 or R2.

By way of example, it is also allowed to dispose resistors for current detection (resistors Rb1 and Rb2), at respective positions (12) and (13) in FIG. 1, and to determine whether the discharging current of the piezoelectric actuator Pn as is detected by the resistor Rb1 or Rb2 has increased to the OFF changeover threshold value Idoff, at S330.

Besides, the resistors Rb1 and Rb2 may be respectively disposed at any positions in current paths which extend from the nodes cp1 and cp2 to the ground potential via the discharging switches SWb and SWd. By way of example, therefore, the resistors Rb1 and Rb2 may be respectively disposed on the lower potential sides of the discharging switches SWb and SWd, or a single resistor (resistor Rb3) may well be disposed at a position (14) in FIG. 1 in place of the resistors Rb1 and Rb2.

The resistors Rb1, Rb2 and Rb3 correspond to discharging path current detection means. Besides, the resistors R1 and R2 are dispensed with in case of performing the discharging switching control in FIG. 7B and the charging switching control in FIG. 9A if the eighth example is implemented, or performing the charging switching control in FIG. 7A if the seventh example is implemented.

Ninth Example

Figure 10:
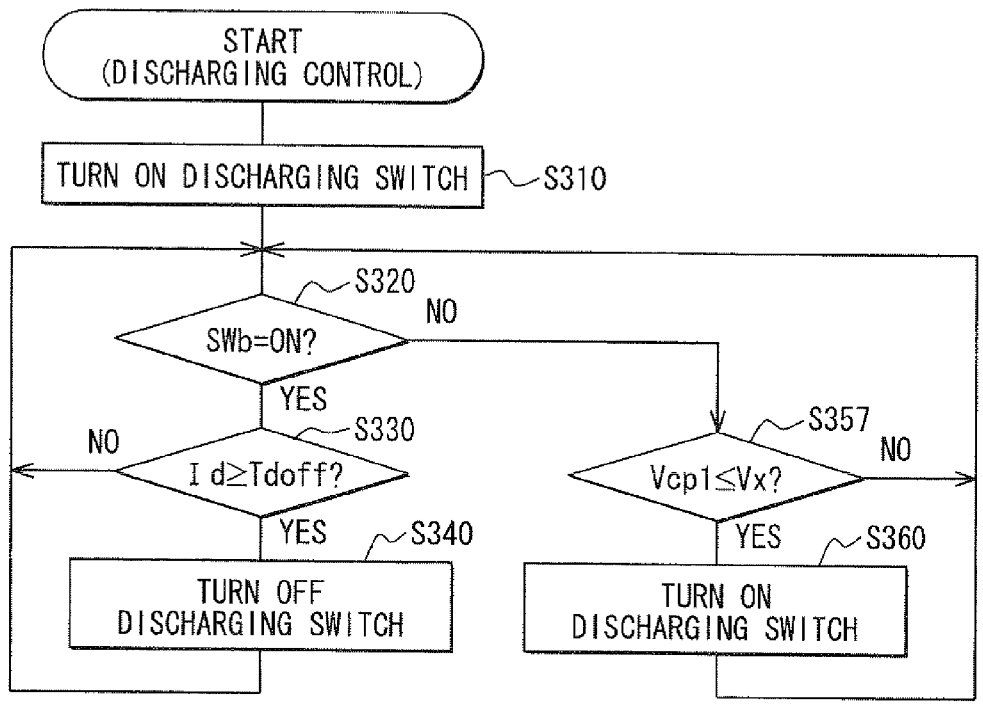
FIG. 10 is a flow chart showing discharging switching control in a ninth example.

In a case where the resistors Rb1 and Rb2 or the resistor Rb3 in the eighth example are disposed, discharging switching control in FIG. 10 may well be performed.

The discharging switching control in FIG. 10 differs from the discharging switching control in FIG. 7B in which the eighth example is implemented in that S357 is executed instead of S355. In this example, the piezoelectric actuator P1 of the first group is assumed to be an element to-be-driven.

In the discharging switching control in FIG. 10, when the discharging switch SWb is held OFF (S320: NO), the voltage of the node cp1 (node voltage Vcp1) is detected. It is then checked whether the node voltage Vcp1 has lowered to a predetermined threshold voltage Vx (S357: NO). When it is determined that the node voltage Vcp1 has lowered to the threshold voltage Vx (S357: YES), the discharging switch SWb is turned on from OFF (S360).

Figure 11:
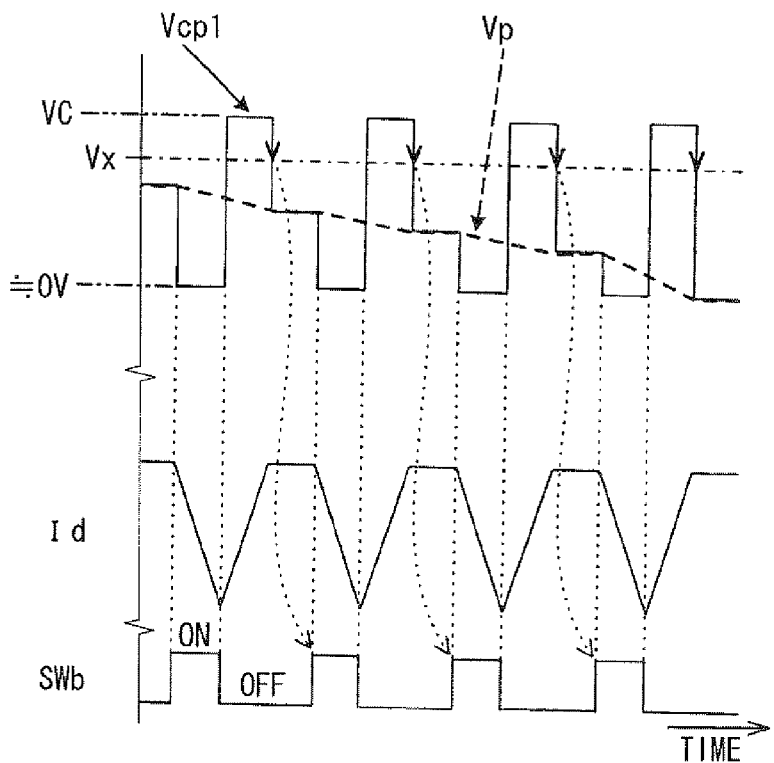
FIG. 11 is an explanatory diagram explaining the discharging switching control in the ninth example.

Here, as shown in FIG. 11, the threshold voltage Vx is set at a value which is lower than the target charged voltage (=200 V) of the capacitor voltage VC and which is higher than the maximum value of the positive side voltage of the piezoelectric actuator Pn (that is, the maximum value of the piezoelectric voltage, and 140 V by way of example).

As shown in FIG. 11, when the discharging switch SWb turns off from ON, the discharging current Id of the piezoelectric actuator P1 being the element to-be-driven flows from the positive side of this piezoelectric actuator P1 to the capacitor C0 through the charging/discharging coil L1 and the diode Da. As a result, the voltage of the node cp1 becomes substantially the capacitor voltage VC (more specifically, it becomes a voltage which is higher than the capacitor voltage VC by the forward voltage of the diode Da). In addition, when the discharging current Id of the piezoelectric actuator P1 thereafter stops flowing, the voltage of the node cp1 becomes equal to the positive side voltage of the piezoelectric actuator P1.

In the discharging switching control in FIG. 10, therefore, when it is determined after the turn-off of the discharging switch SWb that the voltage of the node cp1 has lowered to the threshold voltage Vx, the discharging switch SWb is turned on again. In a case where the piezoelectric actuator P2 or P4 of the second group is driven, the discharging switch SWd is turned on from OFF at the time of the determination that the voltage of the node cp2 has lowered to the threshold voltage Vx.

In addition, such a discharging switching control is advantageous over the discharging switching control in FIG. 7B in that the time point at which the discharging switch SWb or SWd is turned on from OFF can be controlled more appropriately.

Third Embodiment

Figure 12:
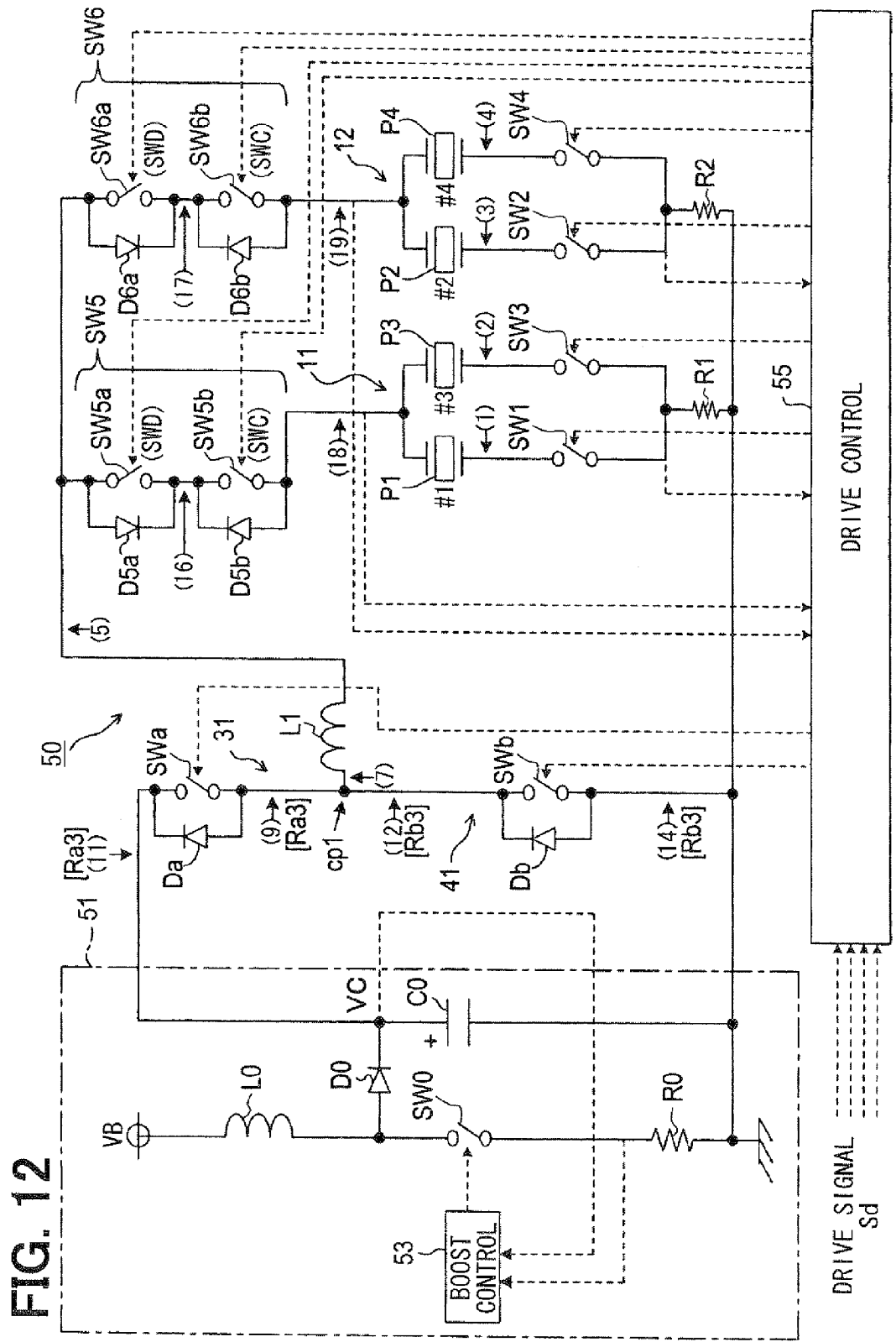
FIG. 12 is a circuit diagram showing a fuel injection control apparatus according to a third embodiment of the present invention.

In this embodiment, as shown in FIG. 12, a fuel injection control apparatus 50 differs from the first and the second embodiments in the following points (1) and (2):

(1) The charging/discharging coil L2, the charging switch SWc and the discharging switch SWd of the first embodiment are omitted. In addition, the charging/discharging coil L1 and the parallel circuit 11 of the first group of the piezoelectric actuators P1 and P3 are connected through a switch SW5, and the charging/discharging coil L1 and the parallel circuit 12 of the second group of the piezoelectric actuators P2 and P4 are connected through a switch SW6.

That is, the charging/discharging coil L1 and the charging switch SWa as well as the discharging switch SWb are included in only one set in the fuel injection control apparatus 50, and the single charging/discharging coil L1 is connected to either of the parallel circuits 11 and 12 of the two groups by being changed over by the switches SW5 and SW6. The group of the piezoelectric actuators to be connected in series with the charging/discharging coil L1 is changed over to either of the first group and the second group. In the following description, therefore, the switches SW5 and SW6 shall be termed the group selection switches. In a case where the engine is of V-type and where the first group and second group of the cylinders are the cylinder groups of the respective banks of the V-type engine, switches operating in the same way as those of the group selection switches SW5 and SW6 are called bank selection switches.

Each of the group selection switches SW5 and SW6 is such that two MOSFETs are connected with the cathodes of their parasitic diodes opposing to each other. More specifically, the group selection switch SW5 on the side of the first group includes a MOSFET being a first switch SW5a, the source of which is connected to one end of the charging/discharging coil L1, and a MOSFET being a second switch SW5b, the source of which is connected to one end of the parallel circuit 11 and the drain of which is connected to the drain of the first switch SW5a. Likewise, the group selection switch SW6 on the side of the second group includes a MOSFET being a first switch SW6a, the source of which is connected to one end of the charging/discharging coil L1, and a MOSFET being a second switch SW6b, the source of which is connected to one end of the parallel circuit 12 and the drain of which is connected to the drain of the first switch SW6a. In FIG. 12, D5a, D5b, D6a and D6b denote parasitic diodes of the switches SW5a, SW5b, SW6a and SW6b, respectively.

In addition, when the two switches SW5a and SW5b forming the group selection switch SW5 are turned on, the charging/discharging coil L1 and the parallel circuit 11 of the first group are connected. When the two switches SW6a and SW6b forming the group selection switch SW6 are turned on, the charging/discharging coil L1 and the parallel circuit 12 of the second group are connected.

However, in case of exemplifying the group selection switch SW5, when at least the first switch SW5a of the first and second switches SW5a and SW5b forming this switch SW5 is turned on, discharging current can be caused to flow from the side of the parallel circuit 11 (the side of the piezoelectric actuator P1 or P3) to the side of the charging/discharging coil L1 through the parasitic diode D5b of the second switch SW5b and the first switch SW5a. Besides, when at least the second switch SW5a of the first and second switches SW5a and SW5b is turned on, a charging current can be caused to flow from the side of the charging/discharging coil L1 to the side of the parallel circuit 11 (the side of the piezoelectric actuator P1 or P3) through the parasitic diode D5a of the first switch SW5a and the second switch SW5b. In the following description, therefore, the first switches SW5a and SW6a shall be termed the discharging permission side switches (SWD), and the second switches SW5b and SW6b the charging permission side switches (SWC).

(2) During a period from the drive signal Sd of any cylinder (represented by #n below) becomes high first to a discharging switching control for closing the injector of the cylinder #n ends (that is, the drive period of the piezoelectric actuator Pn of the cylinder #n, and the period for which the cylinder selection switch SWn corresponding to the cylinder #n is turned on as shown in FIG. 3), the drive controller 55 turns on the group selection switch of the group side of the cylinder #n, in the group selection switches SW5 and SW6, and it turns off the group selection switch of the other group side.

Here, "to turn on the group selection switch SW5 or SW6" means to turn on both the discharging permission side switch SW5a or SW6a and the charging permission side switch SW5b or SW6b which form the group selection switch SW5 or SW6, and "to turn off the group selection switch SW5 or SW6" means to turn off both the discharging permission side switch SW5a or SW6a and the charging permission side switch SW5b or SW6b which form the group selection switch SW5 or SW6. The drive controller 55 need not always turn on both the charging permission side switch and the discharging permission side switch forming the group selection switch of the group side of the cylinder #n, during the drive period of the piezoelectric actuator Pn, but it may well turn on only the charging permission side switch in this charging permission side switch and the discharging permission side switch while the charging switching control is being performed, and turn on only the discharging permission side switch while the discharging switching control is being performed.

The fuel injection control apparatus 50 in the third embodiment is constructed in the same manner as in the first and the second embodiments in other respects. Accordingly, the same advantages as those of the fuel injection control apparatus 50 in the first embodiment can be attained.

Also in the third embodiment, the positions at which the resistors R0, R1 and R2 are disposed can be altered to other positions as in the first embodiment.

More specifically, the resistor R0 may well be interposed between the battery (voltage VB) and the boosting coil L0, or between the boosting coil L0 and the boost switch SW0. In addition, the resistor R1 may well have its components disposed at respective positions (1) and (2) in FIG. 12, or it may well be disposed at a position (16) or a position (18) in FIG. 12. Likewise, the resistor R2 may well have its components disposed at respective positions (3) and (4) in FIG. 12, or it may well be disposed at a position (17) or a position (19) in FIG. 12. Besides, a single resistor operating in the same way as those of the resistors R1 and R2 can be disposed at a position (5) or a position (7) in FIG. 12.

Also in the third embodiment, the boost controller 53 of the DC/DC converter 51 may well perform the boost switching control in FIG. 6, instead of the boost switching control in FIG. 2.

Further, also in the third embodiment, the charging control and the discharging control of any of the first to ninth examples can be implemented. In case of applying the seventh example, the single resistor Ra3 operating in the same manner as the resistors Ra1 and Ra2 may well be disposed at a position (9) or a position (11) in FIG. 12. Besides, in case of applying the eighth example or the ninth example, the single resistor Rb3 operating in the same manner as the resistors Rb1 and Rb2 may well be disposed at a position (12) or a position (14) in FIG. 12.

Although the first to the third embodiments of the present invention have been described above, the invention is not restricted to such embodiments at all, but that the invention can be carried out in various aspects within a scope not departing from the purport thereof.

By way of example, the fuel injection control apparatus may well have a configuration in which only one set formed of a charging/discharging coil and a charging switch as well as a discharging switch is disposed without grouping the piezoelectric actuators P1 to P4. That is, it may well have a circuit configuration in which the charging/discharging coil L2 and the charging switch SWc as well as the discharging switch SWd are omitted from the circuit configuration in FIG. 1, and in which the parallel circuit 12 forming the piezoelectric actuators P2 and P4 is connected to the charging/discharging coil L1.

Contrariwise, the fuel injection control apparatus may well have a circuit configuration in which a charging/discharging coil and a discharging switch as well as a charging switch are disposed for each of the piezoelectric actuators P1 to P4.

Besides, the invention is applicable, not only to the fuel injection control apparatus of the diesel engine, but also to that of a gasoline engine.

Besides, the invention is also applicable to any control apparatuses other than the fuel injection control.

What is claimed is:

1. A piezoelectric actuator drive device comprising:
 a DC/DC converter including a boosting coil that is fed with a power source voltage at one end thereof, a boost switch that is connected in series in a path extending between the other end of the boosting coil and a reference potential lower than the power source voltage, a reverse-flow preventing diode that has an anode connected to a current path extending between the other end of the boosting coil and the boost switch, a capacitor that is connected in series in a path extending between a cathode of the reverse-flow preventing diode and the reference potential, and boost control means for performing boost switching control in which the boost switch is turned on and off repeatedly thereby to charge the capacitor with a current from the reverse-flow preventing diode and to generate a voltage higher than the power source voltage, at a positive terminal of the capacitor on a side opposite to the reference potential;

a charging/discharging coil connected in series with a piezoelectric actuator;

a charging path for feeding a supply voltage to a series circuit of the charging/discharging coil and the piezoelectric actuator from the positive terminal of the capacitor and through a charging switch;

a discharging path connected in parallel with the series circuit for discharging stored charge of the piezoelectric actuator through a discharging switch;

a first diode connected in parallel with the charging switch with a cathode thereof located on a side of the positive terminal of the capacitor;

a second diode connected in parallel with the discharging switch with a cathode thereof located on a side of the charging/discharging coil; and charging/discharging control means for performing charging switching control in response to a drive command externally inputted and discharging switching control in response to a drive stop command externally inputted, the charging switching control being for repeatedly turning on and off the charging switch in an OFF state of the discharging switch thereby to charge and expand the piezoelectric actuator, and the discharging switching control being for repeatedly turning on and off the discharging switch in an OFF state of the charging switch thereby to discharge and contract the piezoelectric actuator, wherein the boost control means and the charging/discharging control means are configured to perform respective controls without detecting a charging current which flows from the reverse-flow preventing diode to the capacitor, respectively.

2. The piezoelectric actuator drive device as in claim 1, further comprising:

boost switch current detection means, provided in a current path extending from the power source voltage to the reference potential via the boosting coil and the boost switch, for detecting current flowing through the boost switch, wherein the capacitor is connected directly to the reference potential at a negative terminal thereof, and wherein the boost control means is configured to turn off the boost switch from ON when the current detected by the boost switch current detection means has increased to an OFF changeover threshold value for the boost switching control in an ON state of the boost switch during performance of the boost switching control, and wherein the boost control means is configured to turn on the boost switch from OFF when a time period for which the boost switch is held OFF reaches an OFF time set value for the boost switching control.

3. The piezoelectric actuator drive device as in claim 1, wherein:

the boost control means is configured to turn off the boost switch from ON when a time period for which the boost switch is held ON reaches an ON time set value for the boost switching control during the performance of the boost switching control; and the boost control means is configured to turn on the boost switch from OFF when a time period for which the boost switch is held OFF reaches an OFF time set value for the boost switching control.

4. The piezoelectric actuator drive device as in claim 1, further comprising:

piezoelectric actuator current detection means for detecting current flowing through the piezoelectric actuator in a current path extending from a node of the charging switch, the discharging switch and the charging/discharging coil to the ground potential via the charging/discharging coil and the piezoelectric actuator, wherein the charging/discharging control means is configured to perform at least one of the charging switching control and the discharging switching control by using a current value detected by the piezoelectric actuator current detection means.

5. The piezoelectric actuator drive device as in claim 1, further comprising:

charging path current detection means for detecting current flowing through a current path in the current path extending from a node of the cathode of the reverse-flow preventing diode and the positive terminal of the capacitor to a node of the charging switch, the discharging switch and the charging/discharging coil via the charging switch, wherein the charging/discharging control means is configured to perform the charging switching control by using a current value detected by the charging path current detection means.

6. The piezoelectric actuator drive device as in claim 5, wherein:

the charging/discharging control means is configured to turn off the charging switch from ON when a charging current of the piezoelectric actuator detected by the charging path current detection means has increased to an OFF changeover threshold value for the charging switching control in an ON state of the charging switch during the performance of the charging switching control; and the charging/discharging control means is configured to turn on the charging switch from OFF when a time period for which the charging switch is held OFF reaches an OFF time set value for the charging switching control.

7. The piezoelectric actuator drive device as in claim 1, further comprising:

discharging path current detection means for detecting a current flowing through a current path extending from a node of the charging switch, the discharging switch and the charging/discharging coil to the reference potential via the discharging switch; and the charging/discharging control means is configured to perform the discharging switching control by using a current value which is detected by the discharging path current detection means.

8. The piezoelectric actuator drive device as in claim 7, wherein:

the charging/discharging control means is configured to turn off the discharging switch from ON when a discharging current of the piezoelectric actuator detected by the discharging path current detection means has increased to an OFF changeover threshold value for the discharging switching control in an ON state of the discharging switch during performance of the discharging switching control, and the charging/discharging control means is configured to turn on the discharging switch from OFF when a time period for which the discharging switch is held OFF reaches an OFF time set value for the discharging switching control.

9. The piezoelectric actuator drive device as in claim 7, wherein:
the charging/discharging control means is configured to turn off the discharging switch from ON when a discharging current of the piezoelectric actuator detected by the discharging path current detection means has increased to an OFF changeover threshold value for the discharging switching control in an ON state of the discharging switch during performance of the discharging switching control, and
the charging/discharging control means is configured to turn on the discharging switch from OFF when a detected voltage of the node of the discharging switch, the charging switch and the charging/discharging coil has lowered to a predetermined threshold voltage in an OFF state of the discharging switch.

10. The piezoelectric actuator drive device as in claim 1, wherein:
the charging/discharging control means is configured to turn off the charging switch from ON when a time period for which the charging switch is held ON reaches an ON time set value for the charging switching control during the performance of the charging switching control, and
the charging/discharging control means is configured to turn on the charging switch from OFF when a time period for which the charging switch is held OFF reaches an OFF time set value for the charging switching control.

11. The piezoelectric actuator drive device as in claim 1, wherein:
the charging/discharging control means is configured to turn off the discharging switch from ON when a time period for which the discharging switch is held ON reaches an ON time set value for the discharging switching control during performance of the discharging switching control, and
the charging/discharging control means is configured to turn on the discharging switch from OFF when a time period for which the discharging switch is held OFF reaches an OFF time set value for the discharging switching control.

12. The piezoelectric actuator drive device as in claim 1, wherein the boost switching control and at least one of the charging switching control and the discharging switching control are performed based on currents detected separately from each other.

13. The piezoelectric actuator drive device as in claim 1, wherein the boost control means and the charging/discharging control means are configured to perform the boost switching control and the charging switching control or the discharging switching control based on currents flowing in current paths different from a current path including the reverse-flow preventing diode and the capacitor, respectively.

14. A drive device for a piezoelectric actuator comprising:
a boosting coil that is fed with a power source voltage at one end thereof;
a boost switch that is connected in series in a path extending between the other end of the boosting coil and a reference potential lower than the power source voltage;
a reverse-flow preventing diode that has an anode connected to a current path extending between the other end of the boosting coil and the boost switch;
a capacitor that is connected in series in a path extending between a cathode of the reverse-flow preventing diode and the reference potential, and boost control means for performing boost switching control in which the boost switch is turned on and off thereby to charge the capacitor with a current from the reverse-flow preventing diode and to generate a voltage higher than the power source voltage at a positive terminal of the capacitor on a side opposite to the reference potential;
a charging switch which charges the piezoelectric actuator by stored energy of the capacitor; and
a discharging switch which discharges stored charges of the piezoelectric actuator,
wherein the boost switch, the charging switch and the discharging switch are controlled without detection of a charging current which flows from the reverse-flow preventing diode to the capacitor.

* * * * *